(12) United States Patent
Sanford et al.

(10) Patent No.: US 11,030,588 B2
(45) Date of Patent: Jun. 8, 2021

(54) SYSTEMS AND METHODS FOR CONTEST FUNDS MANAGEMENT

(71) Applicant: GAMEPLUS INC., Las Vegas, NV (US)

(72) Inventors: Karim Michael Sanford, Las Vegas, NV (US); Kirk E. Sanford, Las Vegas, NV (US)

(73) Assignee: GamePlus Inc., Las Vegas, NV (US)

( * ) Notice: Subject to any disclaimer, the term of this patent is extended or adjusted under 35 U.S.C. 154(b) by 0 days.

(21) Appl. No.: 17/015,200

(22) Filed: Sep. 9, 2020

(65) Prior Publication Data

US 2021/0073749 A1 Mar. 11, 2021

Related U.S. Application Data

(60) Provisional application No. 62/898,070, filed on Sep. 10, 2019, provisional application No. 62/988,987, filed on Mar. 13, 2020, provisional application No. 63/024,561, filed on May 14, 2020.

(51) Int. Cl.
| | |
|---|---|
| *G06Q 20/00* | (2012.01) |
| *G06Q 20/02* | (2012.01) |
| *G06Q 40/02* | (2012.01) |
| *G06Q 20/34* | (2012.01) |
| *A63F 13/792* | (2014.01) |

(Continued)

(52) U.S. Cl.
CPC .......... *G06Q 20/02* (2013.01); *A63F 13/792* (2014.09); *G06Q 20/342* (2013.01); *G06Q 20/349* (2013.01); *G06Q 30/0209* (2013.01); *G06Q 40/02* (2013.01); *G06Q 50/34* (2013.01)

(58) Field of Classification Search
None
See application file for complete search history.

(56) References Cited

U.S. PATENT DOCUMENTS

| | | | | |
|---|---|---|---|---|
| 2002/0058548 | A1* | 5/2002 | Stronach | G07F 17/32 463/25 |
| 2004/0034597 | A1* | 2/2004 | Durand | G07F 7/0866 705/41 |

(Continued)

FOREIGN PATENT DOCUMENTS

| | | | | |
|---|---|---|---|---|
| AU | 2012219416 B2 * | 8/2013 | | G07F 17/34 |
| AU | 2008354731 B2 * | 3/2014 | | G07F 17/3244 |
| AU | 2019271966 A1 * | 12/2019 | | G07F 17/3248 |

OTHER PUBLICATIONS

Harlan et al. Winning at Internet Poker For Dummies. (Apr. 5, 2012). Retrieved online Nov. 21, 2020. http://www.gamblingsystem.biz/books/Winning_at_Internet_Poker_For_Dummies.pdf (Year: 2012).*

(Continued)

*Primary Examiner* — James A Reagan
(74) *Attorney, Agent, or Firm* — Ulmer & Berne LLP

(57) ABSTRACT

Systems and methods to provide players with the ability fund a contest purse for an online video game competition, or other type of contest between players. The funds are sourced from financial accounts that are associated with each player. Upon conclusion of the contest and the determination of a winner, the funds that were held in the contest purse are transferred to the financial account of the contest winner.

16 Claims, 27 Drawing Sheets

(51) Int. Cl.
*G06Q 30/02* (2012.01)
*G06Q 50/34* (2012.01)

(56) References Cited

U.S. PATENT DOCUMENTS

| | | | | |
|---|---|---|---|---|
| 2005/0096124 | A1* | 5/2005 | Stronach | G07F 17/3288 463/25 |
| 2005/0203835 | A1* | 9/2005 | Nhaissi | G06Q 20/10 705/39 |
| 2010/0274567 | A1* | 10/2010 | Carlson | G06Q 30/0225 705/1.1 |
| 2012/0190433 | A1* | 7/2012 | Rowe | G07F 17/3255 463/25 |
| 2015/0187177 | A1* | 7/2015 | Warner | G07F 17/3244 463/25 |
| 2015/0228153 | A1* | 8/2015 | Hedrick | G06Q 20/3223 463/25 |
| 2016/0012465 | A1* | 1/2016 | Sharp | G06Q 20/386 705/14.17 |
| 2016/0203673 | A1* | 7/2016 | Gulbrandsen | G06Q 50/34 463/25 |
| 2018/0096752 | A1* | 4/2018 | Ovalle | G07F 17/3209 |

OTHER PUBLICATIONS

NACHA. Internet Gaming. (Jun. 2014). Retrieved online Feb. 22, 2021. https://www.nacha.org/system/files/resources/Internet%20Gaming.pdf (Year: 2014).*

Dr. Sally M. Gainsbury et al. Convergence of gambling and gaming in digital media. (Sep. 2015). Retrieved online Feb. 22, 2021. https://apo.org.au/sites/default/files/resource-files/2015-12/apo-nid60654.pdf (Year: 2015).*

Young, Lee; International Search Report and Written Opinion of the International Searching Authority, issued in International Application No. PCT/US2020/049809; dated Dec. 10, 2020; 8 pages.

* cited by examiner

CONTEST FUNDING LOCKED

COMPETITOR: PLAYER2

YOUR CONTEST
FUNDING AMOUNT: $ 15

COMPETITOR'S CONTEST
FUNDING AMOUNT: $ 15

PURSE AMOUNT: $ 30

RULES: STANDARD

ENTER OUTCOME OF CONTEST:

( PLAYER1 WON / PLAYER 2 LOST )

( PLAYER2 WON / PLAYER 1 LOST )

( DRAW )

FIG. 14

FINALIZE PAYOUT

WINNER: PLAYER2

PLAYER1:
SELECT ONE OF THE FOLLOWING ( CONFIRM WINNER )

( DISPUTE WINNER )

FIG. 15

SYSTEMS AND METHODS FOR CONTEST FUNDS MANAGEMENT

CROSS REFERENCE TO RELATED APPLICATIONS

This application claims the benefit of U.S. Ser. No. 63/024,561, filed on May 14, 2020, U.S. Ser. No. 62/988,987, filed on Mar. 13, 2020, and on U.S. Ser. No. 62/898,070, filed, Sep. 10, 2019, the disclosures of each are incorporated by reference herein in their entirety.

BACKGROUND

An online game is a video game played over a network on some form of computer, mobile device, or on a video game console, such as a MICROSOFT® XBOX® or a SONY® PLAYSTATION®, for example. Online games can range from simple text based games to mobile games to games incorporating complex graphics and virtual worlds populated by many players simultaneously. Many online games are contests that require skill and strategy and have a social aspect beyond single player games. For example, players can compete head-to-head, on a team, in a tournament, or for the highest score on a leader board. Example categories of online skill-based contests include first person shooters, real time strategy games, social games, role-playing games, board games, card games, and so forth. Many online games are inherently competitive contests with players relying on skill and proficiency to defeat opponents.

BRIEF DESCRIPTION OF THE DRAWINGS

It is believed that certain embodiments will be better understood from the following description taken in conjunction with the accompanying drawings, in which like references indicate similar elements and in which:

FIGS. 11-31 depict example simplified user interfaces in accordance with various embodiments.

DETAILED DESCRIPTION

Figure 1:
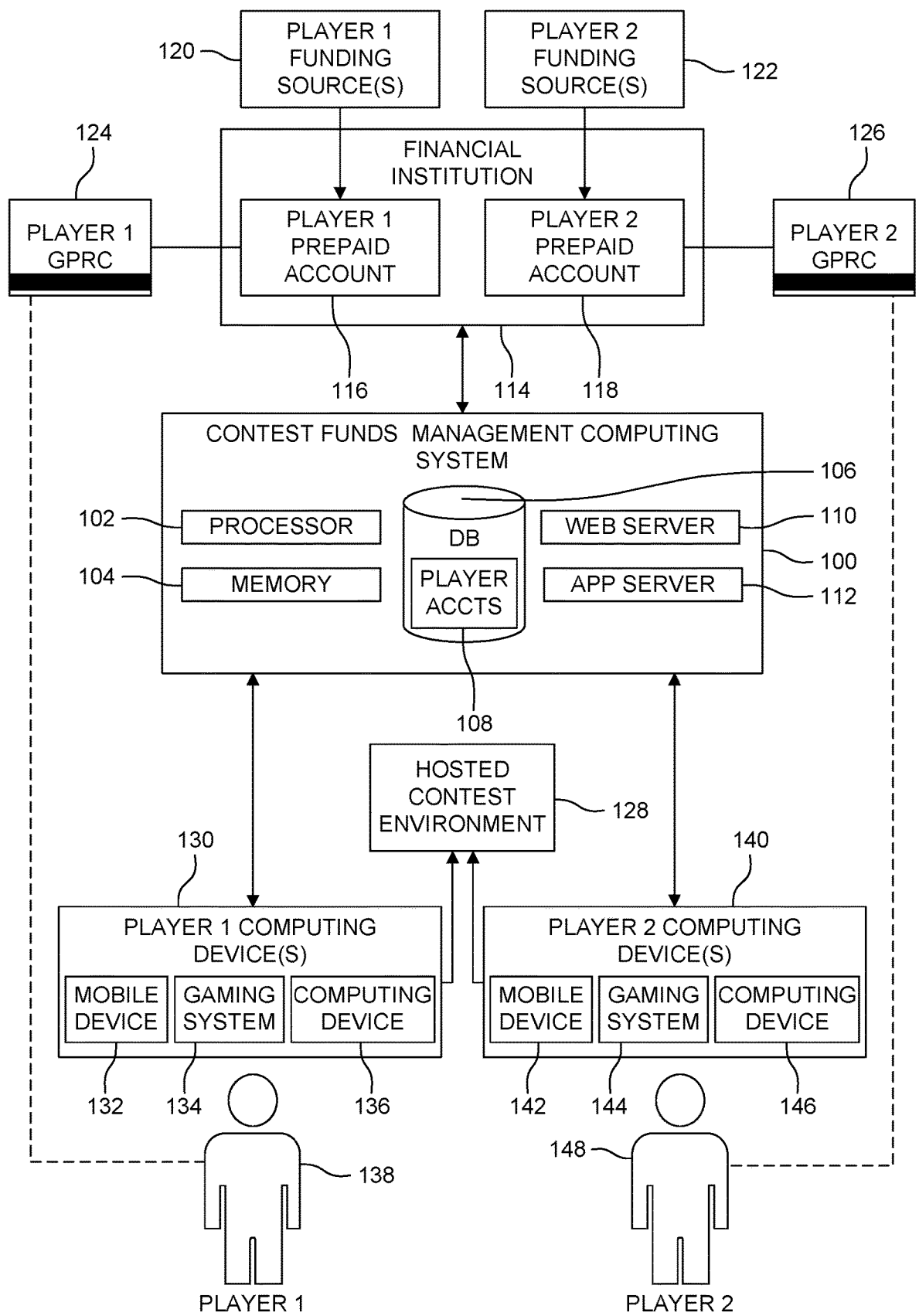
FIGS. 1-4 depict players interacting with example contest funds management computing systems in accordance with non-limiting embodiments.

Various non-limiting embodiments of the present disclosure will now be described to provide an overall understanding of the principles of the structure, function, and use of systems, apparatuses, devices, and methods disclosed. One or more examples of these non-limiting embodiments are illustrated in the selected examples disclosed and described in detail with reference made to FIGS. 1-35 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identification of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented, but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and include a wide variety of electronic information, including executable code; content such as text, video data, and audio data, among others; and various codes or flags. The terms "information," "data," and "content" are sometimes used interchangeably when permitted by context. It should be noted that. although for clarity and to aid in understanding, some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks, than are described.

As described in more detail below, the present disclosure generally relates to contest funds management. While many of the following examples are described in the context of online video games for the purposes of illustration, this disclosure is not so limited. Instead, the systems, apparatuses, devices, and methods described herein can be applicable to a variety of skill-based contests that two or more players may compete in, either head to head or as part of a team. In accordance with various embodiments, a plurality of players can engage with a platform via a computing device such that each can create a player profile and load funds into a financial account. The financial account can be linked to a payment vehicle, such as a prepaid card, or any other type of closed loop or open loop card, thereby giving the player access to the funds in the financial account to make purchases. The player can fund their financial account with funds from any suitable source of funds.

Through the platform, two or more players can agree to enter into a contest, such as an online video game competition. Each player can contribute funds from their financial account into a contest purse. The platform can electronically communicate with the financial institution that holds the financial accounts to effectuate the funding of the contest purse by the players. Upon conclusion of the contest and the determination of a winner, the platform can effectuate transfer of funds that were held in the contest purse to the financial account of the winner. As described in more detail below, the platform can be wholly separate from the gaming system on which the contest was played, with the players providing contest outcome information to the platform. Alternatively, the platform can receive information directly from the system on which the contest was played, such as via a data feed. In other embodiments, the platform can be incorporated directly into, or otherwise leveraged by, the gaming system.

Referring now to FIG. 1, one example embodiment of the present disclosure can comprise a contest funds management computing system 100. The contest funds management computing system 100 can be provided using any suitable processor-based device or system, such as a personal computer, laptop, server, mainframe, or a collection (e.g., network) of multiple computers, for example. The contest funds management computing system 100 can include one or more processors 102 and one or more computer memory units 104. For convenience, only one processor 102 and only one memory unit 104 are shown in FIG. 1. The processor 102 can execute software instructions stored on the memory unit 104. The processor 102 can be implemented as an integrated circuit (IC) having one or multiple cores. The memory unit 104 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

Figure 2:
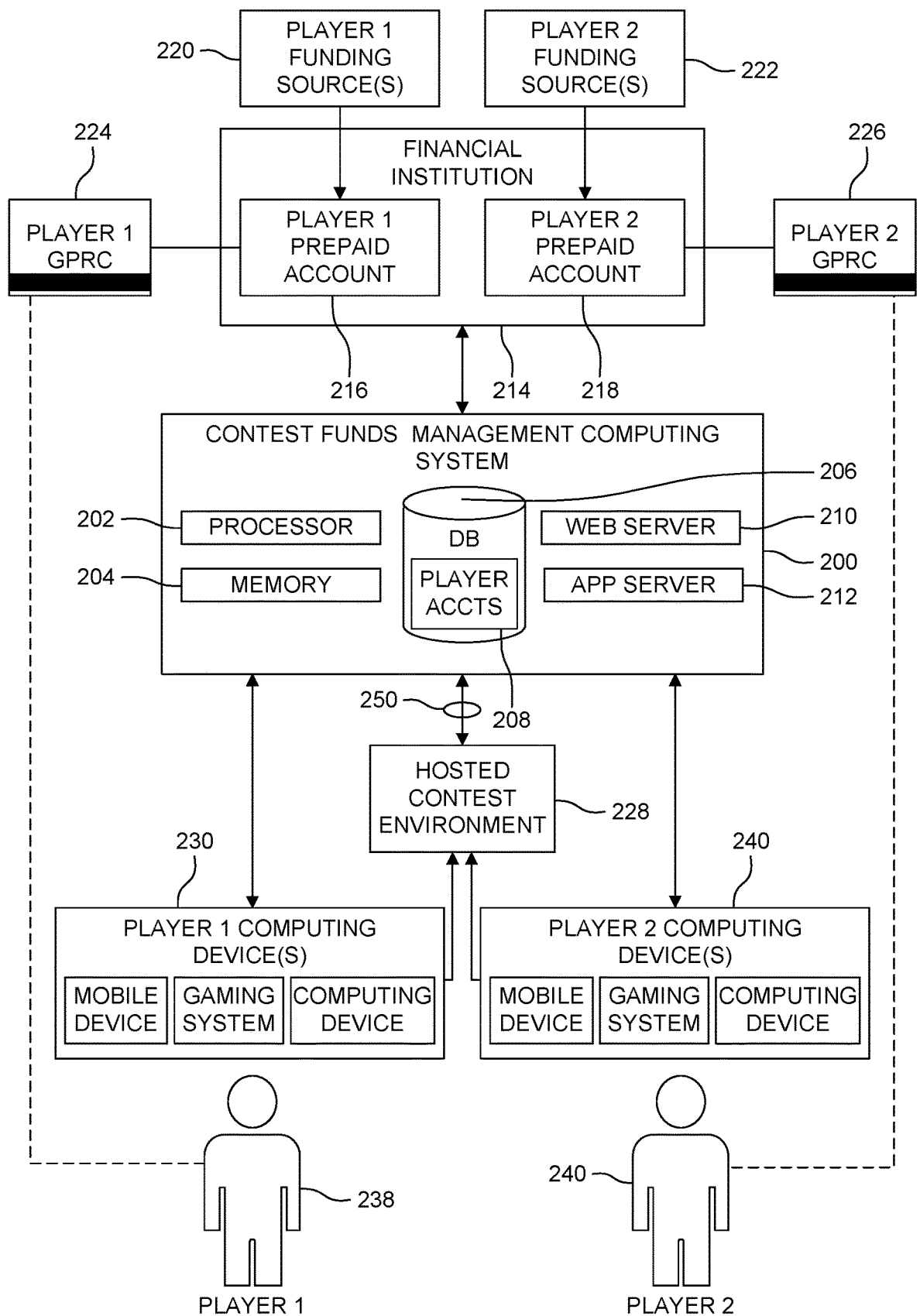

The memory unit 104 can store executable software and data for the contest funds management computing system 100. When the processor 102 of the contest funds management computing system 100 executes the software, the processor 102 can be caused to perform the various operations of the contest funds management computing system 100. Data used by the contest funds management computing system 100 can be from various sources, such as a database(s) 106, which can be am electronic computer database, for example. The data stored in the database(s) 106 can be stored in a non-volatile computer memory, such as a hard disk drive, a read only memory (e.g., a ROM IC), or other types of non-volatile memory. In some embodiments, one or more databases 106 can be stored on a remote electronic computer system, for example. As it to be appreciated, a variety of other databases, or other types of memory storage structures, can be utilized or otherwise associated with the contest funds management computing system 100. The database 106 can store, for example, player accounts 108 that are associated with users of the contest funds management computing system 100. The player accounts 108 can include profiles for users of the contest funds management computing system 100. Further, additional information used by the contest funds management computing system 100 can come from other data sources, such as hosted contest environments (as shown in FIG. 2), among a variety of other data sources.

The contest funds management computing system 100 can be in communication with various player computing devices, shown as computing devices 130 and 140, via an electronic communications network. The communications network can include a number of computer and/or data networks, including the Internet, LANs, WANs, GPRS networks, etc., and can comprise wired and/or wireless communication links.

FIG. 1 shows a first player 138 and a second player 148, which are each associated with one or more of the respective computing devices 130 and 140. While FIG. 1 schematically shows two players for illustration purposes, it is to be appreciated that the systems and methods described herein can be used simultaneously by any suitable number of players, each of which may be geographically remote from one another. The computing devices 130 and 140 can be any type of computer device suitable for communication over the network, such as a wearable computing device, a mobile telephone, a tablet computer, a device that is a combination handheld computer and mobile telephone (sometimes referred to as a "smart phone"), a personal computer (such as a laptop computer, netbook computer, desktop computer, and so forth), or any other suitable mobile communications device, such as personal digital assistants (PDA), gaming devices, or media players, for example. Examples of wearable computing device (sometimes referred to as a "wearable") include devices that incorporate an augmented reality or virtual reality head-mounted display as well as other computing devices that can be worn by players 138 and 148. For illustration purposes, the first player's computing devices 130 are schematically shown to include any of a mobile device 132, a gaming system 134, and a computing device 136. The second player's computing devices 140 are also shown to include any of a mobile device 142, a gaming system 144, and a computing device 146.

The computing devices 130 and 140 can, in some embodiments, provide a variety of applications for allowing the players 138 and 148 to accomplish one or more specific tasks using the contest funds management computing system 100. Applications can include, without limitation, a web browser application (e.g., INTERNET EXPLORER, MOZILLA, FIREFOX, SAFARI, OPERA, NETSCAPE NAVIGATOR) telephone application (e.g., cellular, VoIP, PTT), networking application, messaging application (e.g., e-mail, IM, SMS, MMS, BLACKBERRY Messenger), social media applications, and so forth. The computing devices 130 and 140 can comprise various software programs such as system programs and applications to provide computing capabilities in accordance with the described embodiments. System programs can include, without limitation, an operating system (OS), device drivers, programming tools, utility programs, software libraries, application programming interfaces (APIs), and so forth. Exemplary operating systems can include, for example, a PALM OS, MICROSOFT OS, APPLE OS, ANDROID OS, UNIX OS, LINUX OS, SYMBIAN OS, EMBEDIX OS, Binary Runtime Environment for Wireless (BREW) OS, JavaOS, a Wireless Application Protocol (WAP) OS, and others.

The computing devices 130 and 140 can include various components for interacting with the contest funds management computing system 100. The computing devices 130 and 140 can include components for use with one or more applications such as a stylus, a touch-sensitive screen, keys (e.g., input keys, preset and programmable hot keys), buttons (e.g., action buttons, a multidirectional navigation button, preset and programmable shortcut buttons), switches, a microphone, speakers, an audio headset, and so forth.

The players 138 and 148 can interact with the contest funds management computing system 100 via a variety of other electronic communications techniques, such as, without limitation, HTTP requests, in-app messaging, in-game messaging, and short message service (SMS) messages. The electronic communications can be generated by a specialized application executed on the computing devices 130 and 140 or can be generated using one or more applications that are generally standard to the computing devices 130 and 140. The applications can include or be implemented as executable computer program instructions stored on computer-readable storage media such as volatile or non-volatile memory capable of being retrieved and executed by a processor to provide operations for the computing devices 130 and 140. The memory 104 can also store various databases and/or other types of data structures (e.g., arrays, files, tables, records) for storing data for use by the processor 102 and/or other elements of the computing devices 130 and 140.

As shown in FIG. 1, the contest funds management computing system 100 can include several computer servers and databases. For example, the contest funds management computing system 100 can include one or more web servers 110, application servers 112, and/or any other type of servers. For convenience, only one web server 110 and one application server 112 are shown in FIG. 1, although it should be recognized that the disclosure is not so limited. The servers can cause content to be sent to the computing devices 130 and 140 in any number of formats, such as text-based messages, multimedia message, email messages, smart phone notifications, web pages, and so forth. The servers 110 and 112 can comprise processors (e.g., CPUs), memory units (e.g., RAM, ROM), non-volatile storage systems (e.g., hard disk drive systems), etc. The servers 110 and 112 can utilize operating systems, such as Solaris, Linux, or Windows Server operating systems, for example.

The web server 110 can provide a graphical web user interface through which various users of the system can interact with the contest funds management computing system 100. The web server 110 can accept requests, such as HTTP requests, from clients (such as web browsers on the computing devices 130 and 140), and serve the clients responses, such as HTTP responses, along with optional data content, such as web pages (e.g., HTML documents) and linked objects (such as images, video, and so forth).

The application server 112 can provide a user interface for users who do not communicate with the contest funds management computing system 100 using a web browser. Such users can have special software installed on their computing device 130 and 140 that allows them to communicate with the application server 112 via the network. Such software can be downloaded, for example, from the contest funds management computing system 100, or other software application provider, over the network to such computing devices 130 and 140.

The contest funds management computing system 100 can also be in communication with a financial institution 114 via a communication network connection. In some embodiments, the contest funds management computing system 100 is in communication with the financial institution 114 via a closed-loop private network. The financial institution 114 can maintain various accounts, such as prepaid accounts or demand deposit accounts. In the illustrated embodiment, the financial institution 114 maintains a prepaid account 116 on behalf of the first player 138 and another prepaid account 118 on behalf of the second player 148. Each of the accounts 116 and 118 can have a balance of funds that are accessible by the player. Furthermore, payment vehicles can be issued to each of the players to facilitate access to funds in the accounts 116 and 118 for financial transactions. In the illustrated embodiment, a first general purpose reloadable card 124 is issued to the first player 138 and a second general purpose reloadable card 126 is issued to the second player 148. Each of these cards 124 and 126 can be provided in any suitable format, such as a physical card with a magnetic stripe, optical code, or an embedded chip, for example. Additionally or alternatively, the cards 124 and 126 can be a "virtual" card that is associated with a mobile wallet accessible through a mobile communication device, for example.

The players 138 and 148 can load funds into the accounts 116 and 118 using funds from player funding sources 120 and 122, respectively. The funding sources 120 and 122 can include any suitable source, such as credit or debit card accounts, checking accounts, savings accounts, prepaid accounts, and so forth. Further, the financial institution 114 can load funds into the accounts 116 and 188 via any suitable transfer technique, such as intra-bank transfer, automated clearing house (ACH) transfer, and so forth.

Through interactions with the contest funds management computing system 100 via their computing devices 130 and 140, each player 138 and 148 can opt to select an amount of funds from their respective accounts 116 and 118 to be placed into a purse associated with a particular contest in which the players 138 and 148 will be competing. FIG. 1 depicts each of the players 138 and 148 competing in a contest that is facilitated through a hosted contest environment 128. In accordance with one non-limiting embodiment, the hosted contest environment 128 is provided by EPIC GAMES®, although this disclosure is not so limited. Each player 138 and 148 can interact with the hosted contest environment 128 via a suitable computing device 130 and 140 to compete in the competition. It is noted that the computing devices 130 and 140 used by the players 138 and 148 to interact with the hosted contest environment 128 can be either the same device or a different device than was used by the players 138 and 148 to interact with the contest funds management computing system 100. By way of example, the first player 138 may interact with the contest funds management computing system 100 via a mobile device 132 but play in a contest on the hosted contest environment 128 by using a gaming system 134 or other computing device 136, such as a laptop or desktop computer.

Once a winner of the contest is declared, one or both of the players 138 and 148 can provide an identification of the winner to the contest funds management computing system 100. In the illustrated embodiment, the winner of the contest is one of the first player 138 or the second player 148. Based on the winner, the contest funds management computing system 100 can communicate funding instructions to the financial institution 114. The funding instructions can generally instruct the financial institution 114 to transfer funds from the contest purse to either the first player's account 116 or the second player's account 118, based on who is deemed the winner of the contest. As is to be appreciated, in some embodiments, at least a portion of the contest purse (such as a percentage of the purse or a flat-fee amount) may be transferred to a financial account associated with the contest funds management computing system 100, or other entity or entities, with the remaining funds being transferred to the winner's account. In any event, once the funds are transferred to the winner's account, in accordance with various embodiments, the winner can access the funds in real-time time via the payment vehicle associated with the financial account. Furthermore, as described in more detail below, in accordance with various embodiments of contest funds management computing systems, the contest funds management computing system may provide a dispute resolution function, allowing players to challenge the outcome of the contest and the purse payout.

FIG. 2 depicts another embodiment of a contest funds management computing system 200 that is configured to facilitate funds transfers between accounts 216 and 218 at a financial institution 214. Similar to FIG. 1, each of the accounts 216 and 218 can be associated with a first player 238 and a second player 248, respectively. Each player also can be issued a payment vehicle 224 and 226, which are shown as general purpose reloadable cards in FIG. 2, although this disclosure is not so limited. Also similar to FIG. 1, the contest funds management computing system 200 can include a processor 202, a memory unit 204, and a database 206 storing player account information 208. The contest funds management computing system 200 can also include, for example, a web server 210 and an app server 212. The players 238 and 248 can agree to enter into a contest on a hosted contest environment 228. Through interactions with the contest funds management computing system 200 via their respective computing devices 230 and 240, the players 238 and 248 can cause a contest purse to be funded with funds from their accounts 216 and 218.

In this embodiment, however, a data feed 250 is used to supply contest information from the hosted contest environment 228 to the contest funds management computing system 200. The data feed 250 can be any suitable type of communications link, such as an Application Programming Interface (API), which is configured to provide either unidirectional or bidirectional communication between the contest funds management computing system 200 and the hosted contest environment 228. In this regard, the data feed 250 can be used by the contest funds management computing system 200 to receive information regarding the contest between the players 238 and 248 that is being played on the hosted contest environment 228. The information received from the hosted contest environment 228 can vary based on implementation. In some embodiments, the data feed 250 is a relatively basic feed that provides to the contest funds management computing system 200 data that identifies the winner of the contest. In other embodiments, the data feed 250 is more robust and provides other information, such as real-time scoring, player-related information, contest-related information, or any other information that can be used by the contest funds management computing system 200.

Figure 3:
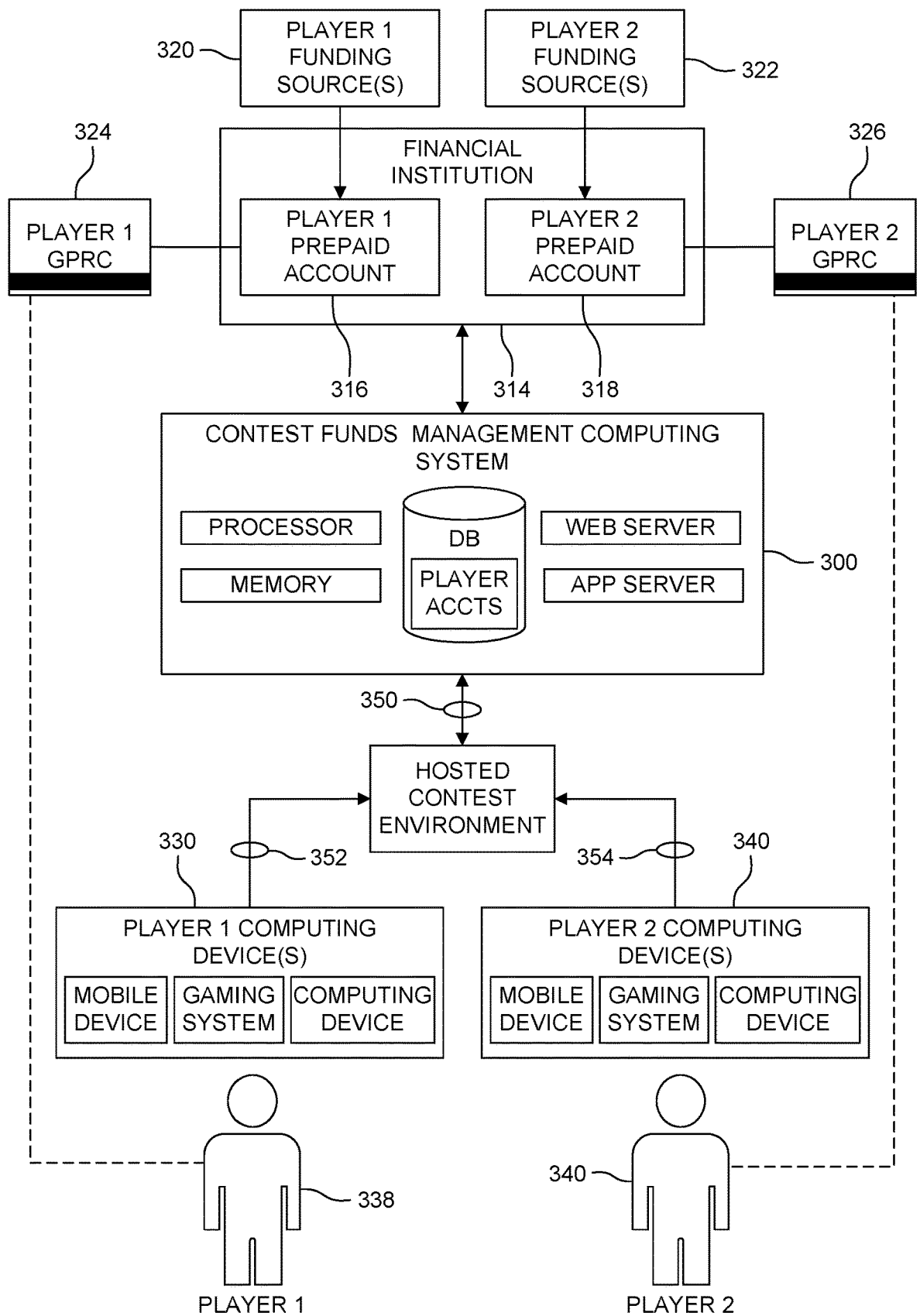

FIG. 3 depicts another embodiment of a contest funds management computing system 300 that is configured to facilitate funds transfers between accounts 316 and 318 at a financial institution 314. Similar to the previous embodiments, each of the accounts 316 and 318 can be associated with a first player 338 and a second player 348, respectively. Each player also can be issued a payment vehicle 324 and 326, which are shown as general purpose reloadable cards in FIG. 3, although this disclosure is not so limited. The players 338 and 348 can agree to enter into a contest on a hosted contest environment 328. In this embodiment, however, the players utilize their computing devices 330 and 340 to interact directly with the hosted contest environment 328 via communications 352 and 354 to cause a contest purse to be funded with funds from their accounts 316 and 318. For example, the hosted contest environment 328 can provide in-game menu options to allow the players 338 and 348 to designate a contest, fund a contest purse, and so forth. The hosted contest environment 328, via communications 350, can relay the information related to the contest to the contest funds management computing system 300. In turn, the contest funds management computing system 300 provides the necessary communications to the financial institution 314 to fund a purse associated with a contest between the first player 338 and the second player 348. At the conclusion of the contest, the hosted contest environment 328 can provide the winner information to the contest funds management computing system 300 so that the purse funds can be appropriately distributed.

Figure 4:
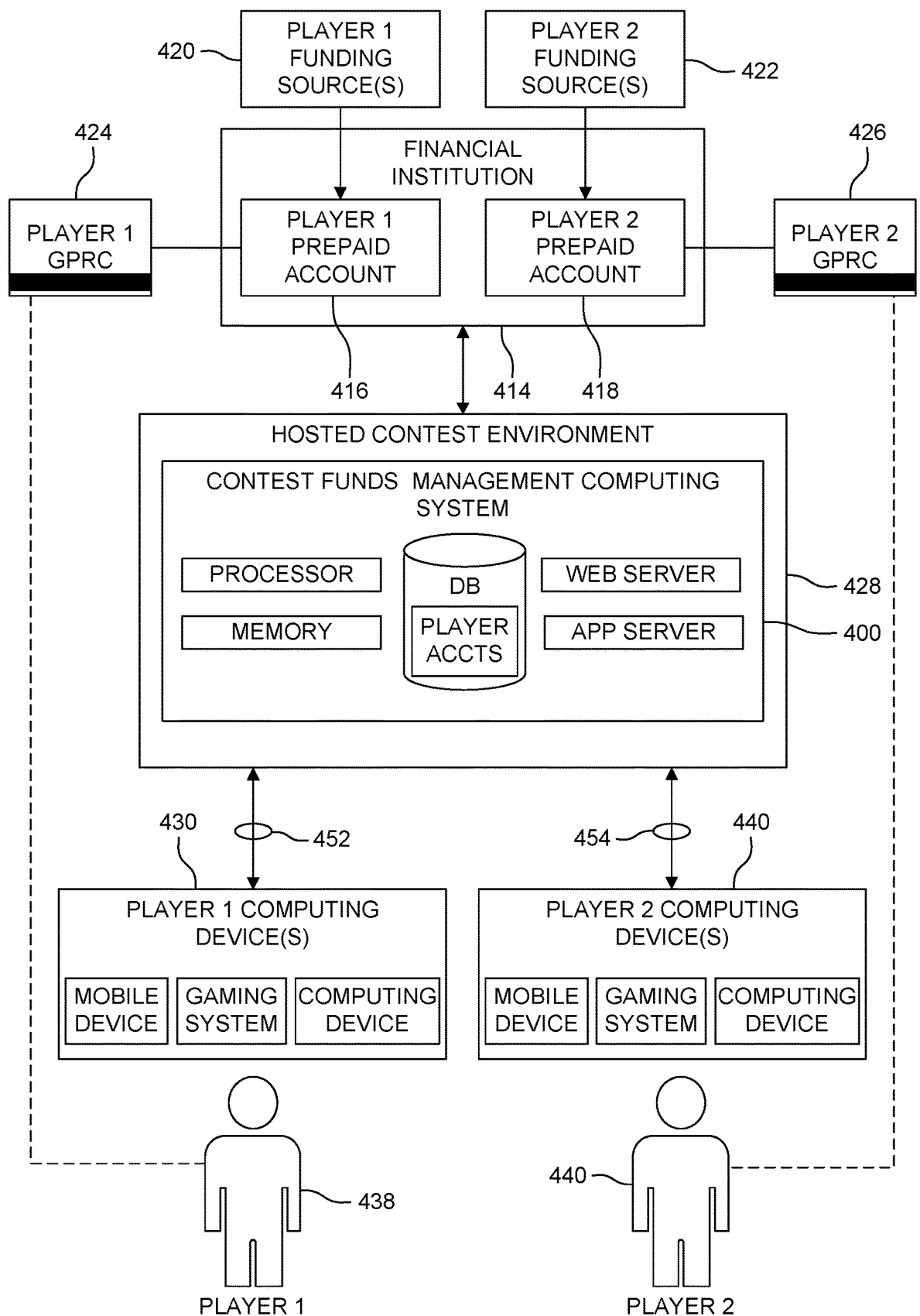

FIG. 4 depicts another embodiment of a contest funds management computing system 400 that is configured to facilitate funds transfers between accounts 416 and 418 at a financial institution 414. Similar to the previous embodiments, each of the accounts 416 and 418 can be associated with a first player 438 and a second player 448, respectively. Each player also can be issued a payment vehicle 424 and 426, which are shown as general purpose reloadable cards in FIG. 4, although this disclosure is not so limited. The players 438 and 448 can agree to enter into a contest on a hosted contest environment 428. In this embodiment, the players utilize their computing devices 430 and 440 to interact directly with the hosted contest environment 428 via communications 452 and 454 thereby causing a contest purse to be funded with funds from their accounts 416 and 418. The hosted contest environment 428, in this embodiment, incorporates the contest funds management computing system 400. The contest funds management computing system 400 of the hosted contest environment 428 provides the necessary communications to the financial institution 414 to fund a purse associated with a contest between the first player 438 and the second player 448. At the conclusion of the contest, the contest funds management computing system 400 can communicate with the financial institution 414 so that the purse funds can be appropriately distributed.

Hosted contest environments, such as any of hosted contest environments 128, 228, 328, and 428, can be provided by, for example, XBOX, PLAYSTATION, GOOGLE STADIA, NINTENDO, or STEAM, among a variety of others providers of hosted contest environments. As is known in the art, such hosted contest environments can maintain a profile for players, which are sometimes referred to as a gamer profile, a player profile, or a user profile, for example. The profiles can, for example, include a picture or avatar of the player, biographical information, player statistics, as well as a variety of other player information. In accordance with the present embodiment, a player account for a player that is maintained by a contest funds management computing system (such as any of the contest funds management computing systems 100, 200, 300, and 400) can be connected to or otherwise linked to the profile for that player that is maintained by the hosted contest environment. As such, information from the player account can be reflected in the player's profile when the player is accessing their profile. Additionally or alternatively, information from the player's profile can be reflected in the player account when the player is accessing their player account.

While FIGS. 1-4 schematically depict single player versus single player (i.e., head-to-head), it is to be appreciated that other contest types can utilize the systems and methods described herein. FIGS. 5-8, for example, depict team-style contests in which a first team having a plurality of players competes in a contest against a second team having a plurality of players. Each player on each team can contribute to a purse, with the purse ultimately being distributed to the players on the winning team. In accordance with various embodiments, contest funds management computing systems can facilitate both head-to-head contest purses and team-vs-team contest purses.

Figure 5:
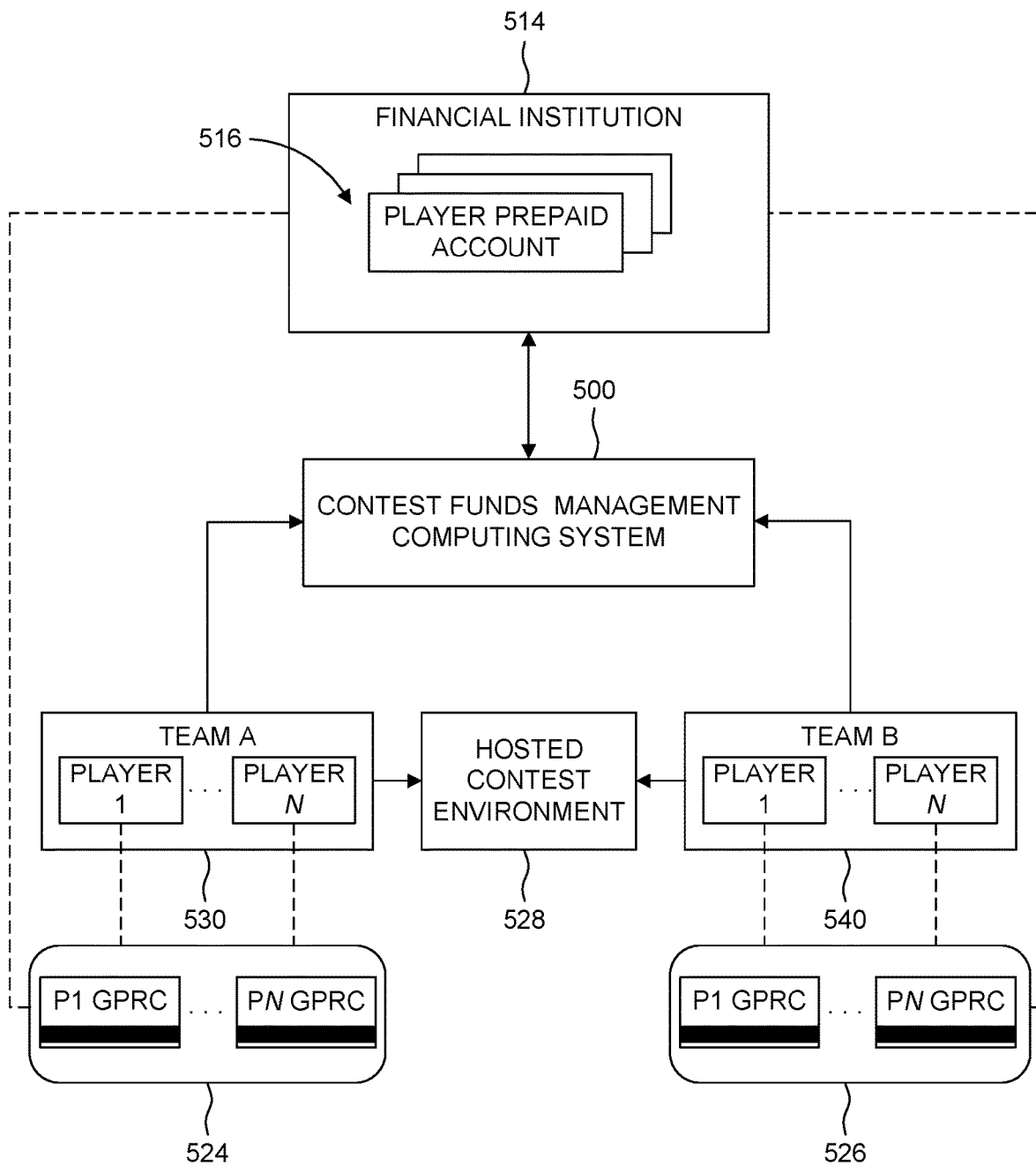
FIGS. 5-8 depict teams of players interacting with example contest funds management computing systems in accordance with non-limiting embodiments.

FIG. 5 depicts a contest funds management computing system 500 that facilitates contest purse management for a first team 530 (Team A) and a second team 540 (Team B). The first team 530 can include any suitable number of players, shown as players 1 . . . N. The second team 540 can include any suitable number of players, shown as players 1 . . . N. Each of the players on the first team 530 can be associated with a respective payment vehicle 524 and each of the players on the second team 540 can be associated with a respective payment vehicle 526. Each payment vehicle 524 and 526 can be used by the respective player 530 and 540 to access funds held in a respective financial account 516 at a financial institution 514. The financial accounts 516 of the players can each be funded from external funding sources.

Through interactions with the contest funds management computing system 500 via their computing devices (not shown), each player on both teams 530 and 540 can opt to select an amount of funds from their respective accounts 516 to be placed into a purse associated with a particular contest in which the teams will be competing. FIG. 5 depicts each of the teams 530 and 540 competing in a contest that is facilitated through a hosted contest environment 528. In accordance with one non-limiting embodiment, the hosted contest environment 528 is provided by EPIC GAMES®, although this disclosure is not so limited. Each player of each team 530 and 540 can interact with the hosted contest environment 528 via a suitable computing device to compete in the competition.

Once a winning team of the contest is declared, the contest funds management computing system 500 can communicate funding instructions to the financial institution 514. The funding instructions can generally instruct the financial institution 514 to transfer funds from the contest purse to each of the accounts 516 of the players on the winning team. Once the funds are transferred to each of the winning players' accounts, in accordance with various embodiments, the winners can access the funds in real-time time via the payment vehicles associated with those financial accounts.

Figure 6:
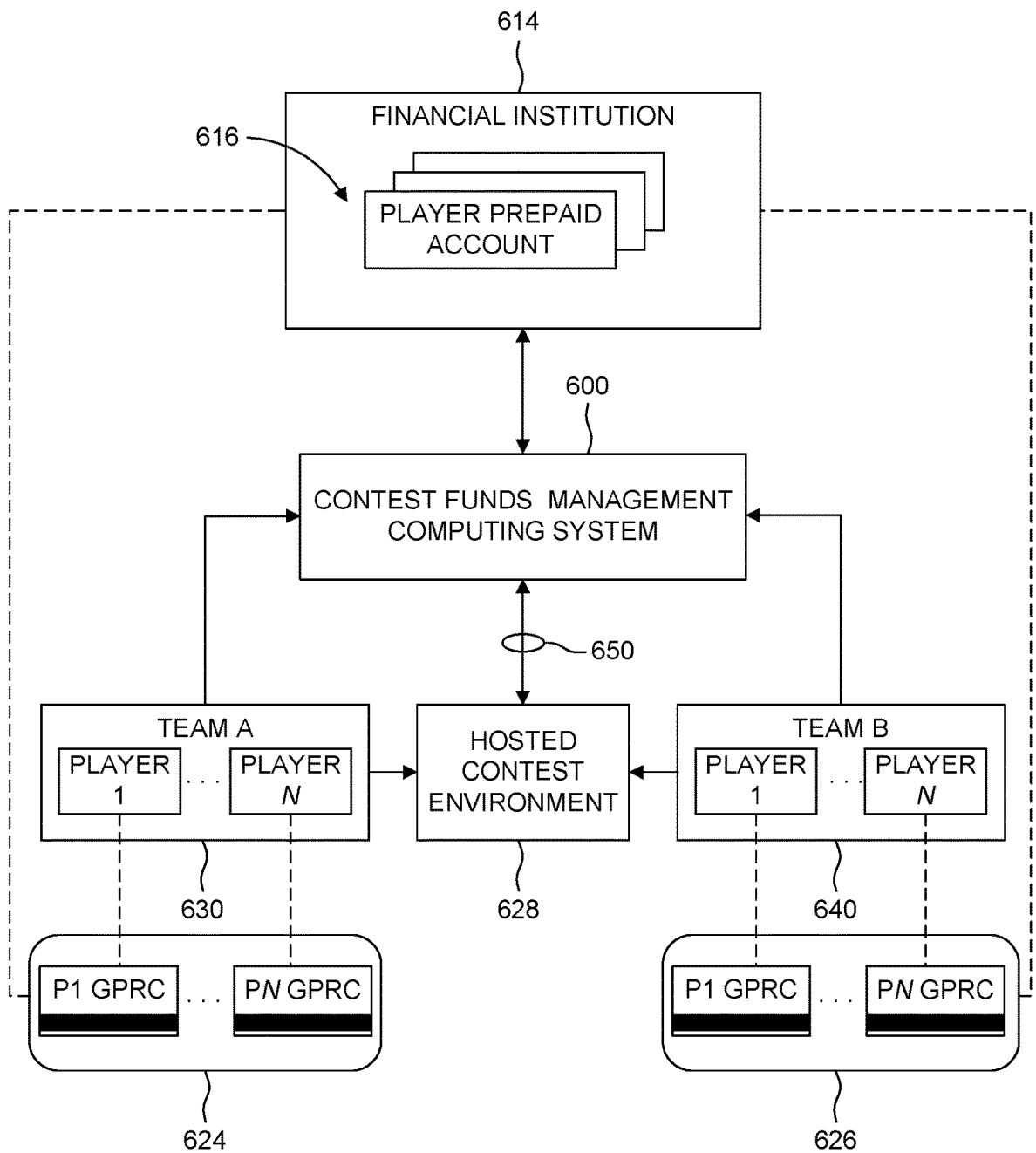

FIG. 6 depicts a contest funds management computing system 600 that facilitates contest purse management for a first team 630 (Team A) and a second team 640 (Team B). The first team 630 can include a plurality of players 1 . . . N. The second team 640 can include a plurality of players 1 . . . N. Each of the players on the first team 630 can be associated with a respective payment vehicle 624 and each of the players on the second team 640 can be associated with a respective payment vehicle 626. Each payment vehicle can be used by the respective players to access funds held in a respective financial account 616 at a financial institution 614. The financial accounts 616 of the players can each be funded from external funding sources.

Through interactions with the contest funds management computing system 600 via their computing devices (not shown), each player on both teams 630 and 640 can opt to select an amount of funds from their respective accounts 616 to be placed into a purse associated with a particular contest in which the teams will be competing. FIG. 6 depicts each of the teams 630 and 640 competing in a contest that is facilitated through a hosted contest environment 628. In accordance with one non-limiting embodiment, the hosted contest environment 628 is provided by EPIC GAMES®, although this disclosure is not so limited. Each player of each team 630 and 640 can interact with the hosted contest environment 628 via a suitable computing device to compete in the competition.

In this embodiment, a data feed 650 is used to supply contest information from the hosted contest environment 628 to the contest funds management computing system 600. The data feed 650 can be any suitable type of communications link, such as an Application Programming Interface (API), which is configured to provide either unidirectional or bidirectional communication between the contest funds management computing system 600 and the hosted contest environment 628. In this regard, the data feed 650 can be used by the contest funds management computing system 600 to receive information regarding the contest between the teams 630 and 640 that is being played on the hosted contest environment 628. The information received from the hosted contest environment 628 can vary based on implementation. In some embodiments, the data feed 650 is a relatively basic feed that provides the winner of the contest to the contest funds management computing system 600. In other embodiments, the data feed 650 is more robust and provides other information, such as real-time scoring, player-related information, team-related information, contest-related information, or any other information that can be used by the contest funds management computing system 600.

Figure 7:
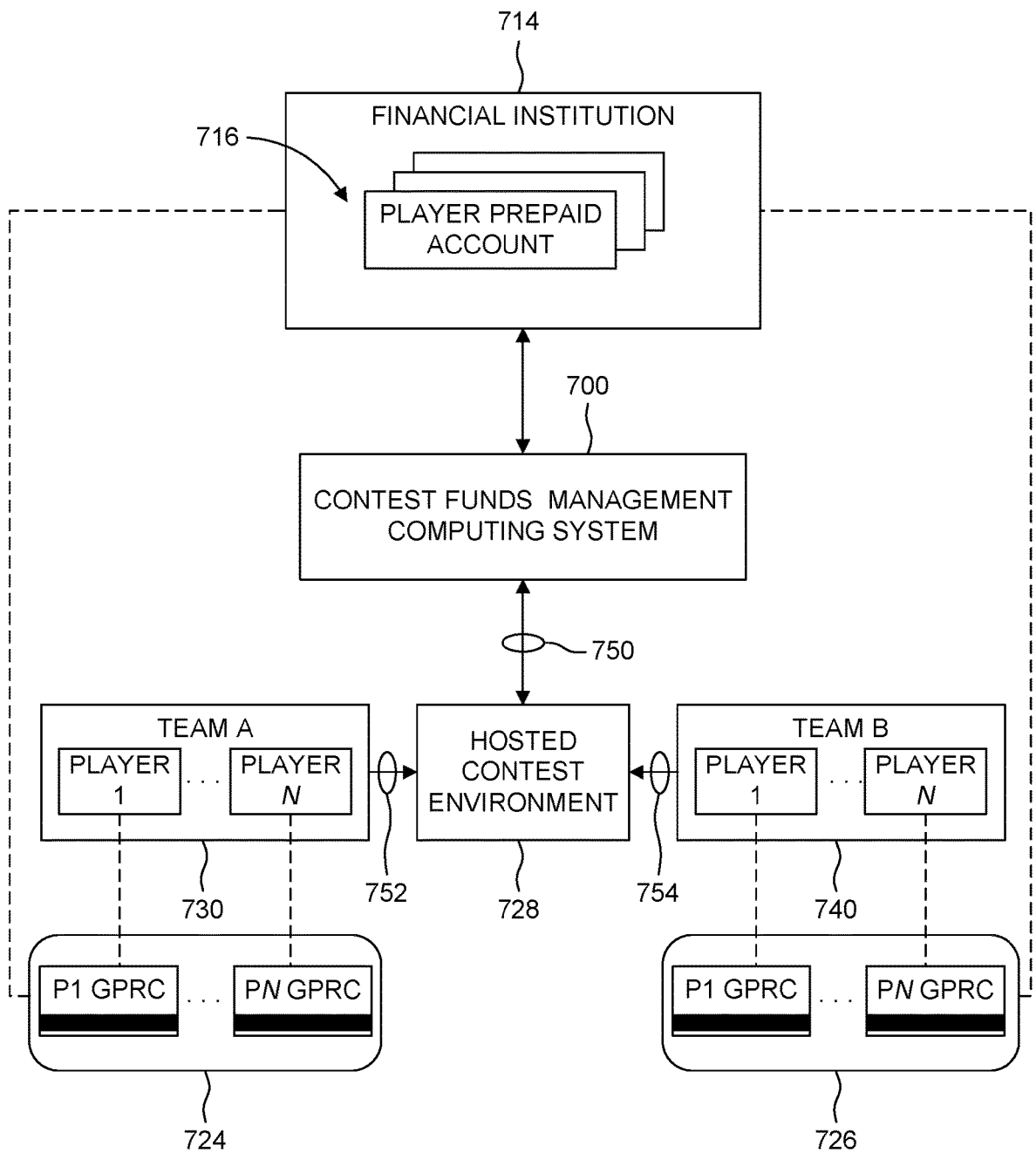

FIG. 7 depicts a contest funds management computing system 700 that facilitates contest purse management for a first team 730 (Team A) and a second team 740 (Team B). The first team 730 can include a plurality of players 1 . . . N. The second team 740 can include a plurality of players 1 . . . N. Each of the players on the first team 730 can be associated with a respective payment vehicle 724 and each of the players on the second team 740 can be associated with a respective payment vehicle 726. Each payment vehicle can be used by the respective player to access funds held in a respective financial account 716 at a financial institution 714. The financial accounts 716 of the players can each be funded from external funding sources.

In this embodiment, the teams interact directly with a hosted contest environment 728 via communications 752 and 754 (i.e., via suitable computing devices) to cause a contest purse to be funded with funds from their respective accounts 716. For example, the hosted contest environment 728 can provide in-game menu options to allow the teams 730 and 740 to designate a contest, fund a contest purse, and so forth. The hosted contest environment 728, via communications 750, can relay the information related to the contest to the contest funds management computing system 700. In turn, the contest funds management computing system 700 provides the necessary communications to the financial institution 714 to fund a purse associated with a contest between the first team 730 and the second team 740. At the conclusion of the contest, the hosted contest environment 728 can provide the winner information to the contest funds management computing system 700 so that the purse funds can be appropriately distributed.

Figure 8:
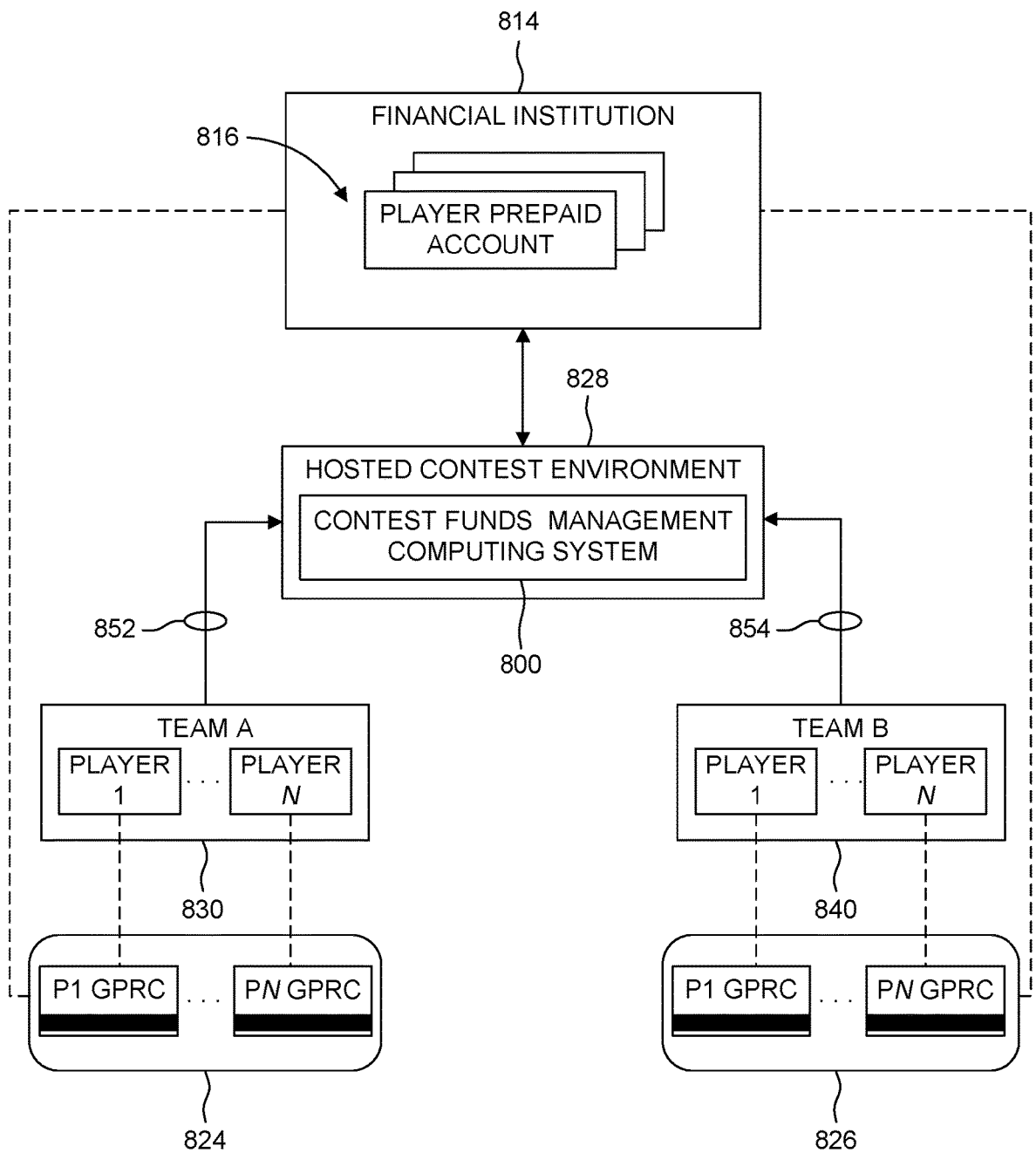

FIG. 8 depicts a contest funds management computing system 800 that facilitates contest purse management for a first team 830 (Team A) and a second team 840 (Team B). The first team 830 can include a plurality of players 1 . . . N. The second team 840 can include a plurality of players 1 . . . N. Each of the players on the first team 830 can be associated with a respective payment vehicle 824 and each of the players on the second team 840 can be associated with a respective payment vehicle 826. Each payment vehicle can be used by the respective player to access funds held in a respective financial account 816 at a financial institution 814. The financial accounts 816 of the players can each be funded from external funding sources. In this embodiment, the players utilize their computing devices to interact directly with a hosted contest environment 828 via communications 852 and 854 to cause a contest purse to be funded with funds from the accounts 816. The hosted contest environment 828, in this embodiment, incorporates the contest funds management computing system 800. The contest funds management computing system 800 of the hosted contest environment 828 provides the necessary communications to the financial institution 814 to fund a purse associated with a contest between the first team 830 and the second team 840. At the conclusion of the contest, the contest funds management computing system 800 can communicate with the financial institution 814 so that the purse funds can be appropriately distributed.

Figure 9:
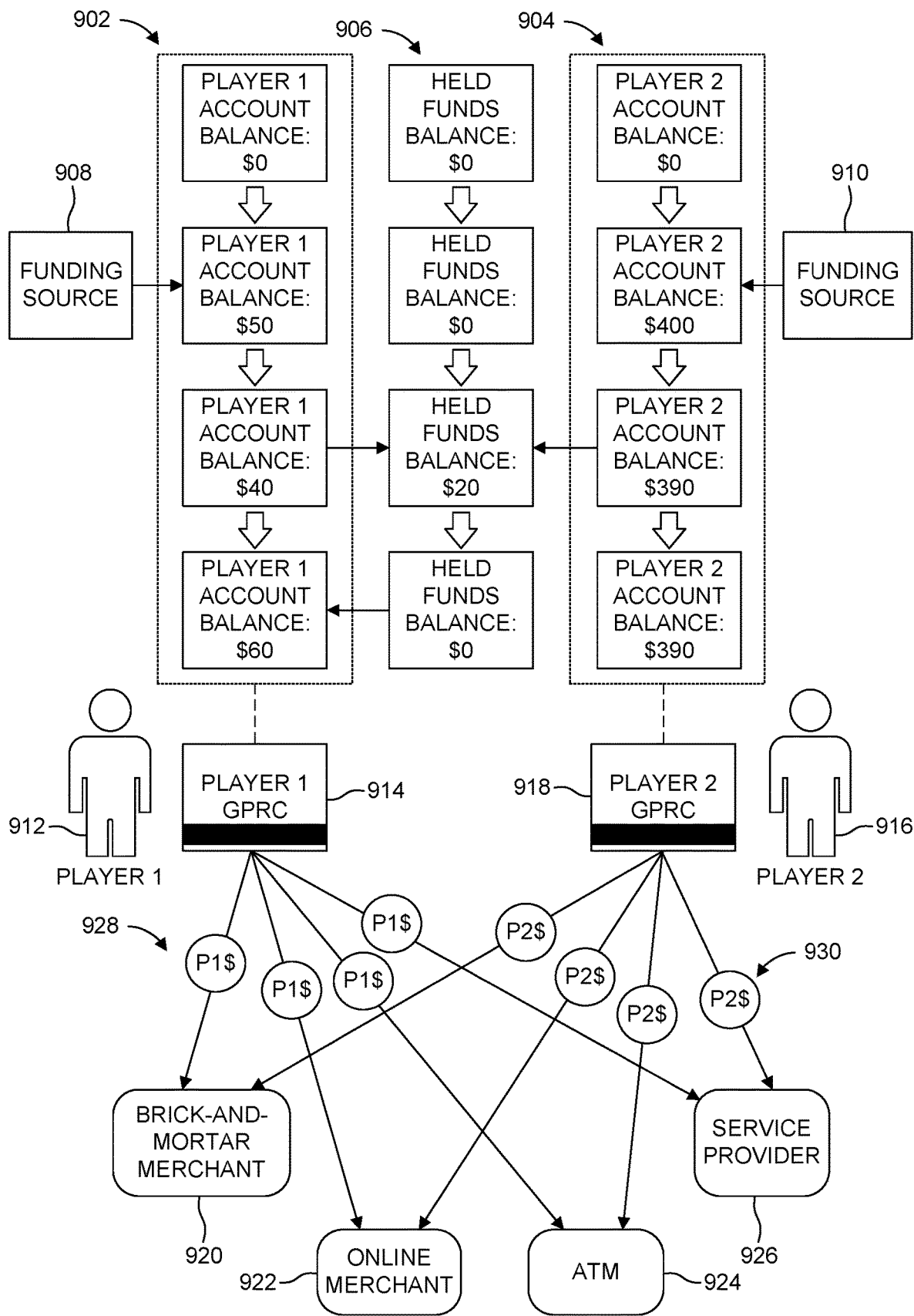
FIGS. 9-10 depict the balances of various accounts over time in accordance with non-limiting embodiments.

Referring now to FIG. 9, the balances of various accounts over time are depicted in accordance with one non-limiting embodiment. As shown, a first player 912 is associated with a player account 902 and a second player 916 is associated with a player account 904. The first player 912 is also associated with a payment vehicle 914, which can be, for example, a general purpose reloadable card that is usable to access funds held in the player account 902. The second player 916 is also associated with a payment vehicle 918, which can be, for example, a general purpose reloadable card that is usable to access funds held in the player account 904. The first player 912 can use the payment vehicle 914 for any of a variety of transactions 928 and the second player 916 can use the payment vehicle 918 for any of a variety of transactions 930. As shown, the transaction 928 and 930 can include, for example, transactions at brick-and-mortar merchants 920 (i.e., "card present" transactions), at online merchants 922 (i.e., "card not present" transactions), at ATMs 924, and at various service providers 926.

Both of the players 912 and 916 can access a contest funds management computing system, such as any of the contest funds management computing systems illustrated in FIGS. 1-8. In the illustrated embodiment, both accounts 902 and 904 are shown to start with a zero balance. The first player 912 can fund the account 902 with funds from a funding source 908. FIG. 9 depicts the first player 912 initially loading the account 902 with $50. The second player 916 can fund the account 904 with funds from a funding source 910. FIG. 9 depicts the second player 916 initially loading the account 904 with $400.

Next, through a contest funds management computing system, both players 912 and 916 agree to each fund a purse 906 with $10, thereby creating a $20 purse. The funds associated with the purse 906 can be held using any suitable technique. For example, in some implementations, a financial institution may transfer the funds from each of the player's accounts 902 and 904 into a temporary holding account. In other implementations, a financial institution may place a temporary authorization hold on the funds in each of the player's accounts 902 and 904 that are tied to the purse 906. Other approaches for holding player funds in the purse 906 can be used without departing from the scope of the present disclosure.

Once the outcome of the contest is determined, the funds held in the purse 906 can be transferred to the winner's account, shown here as the first player's account 902. Thus, subsequent to the transfer, the account balance of the account 902 is increased by the amount of funds in the purse 906 (less any fees or charges, as may be applicable).

Figure 10:
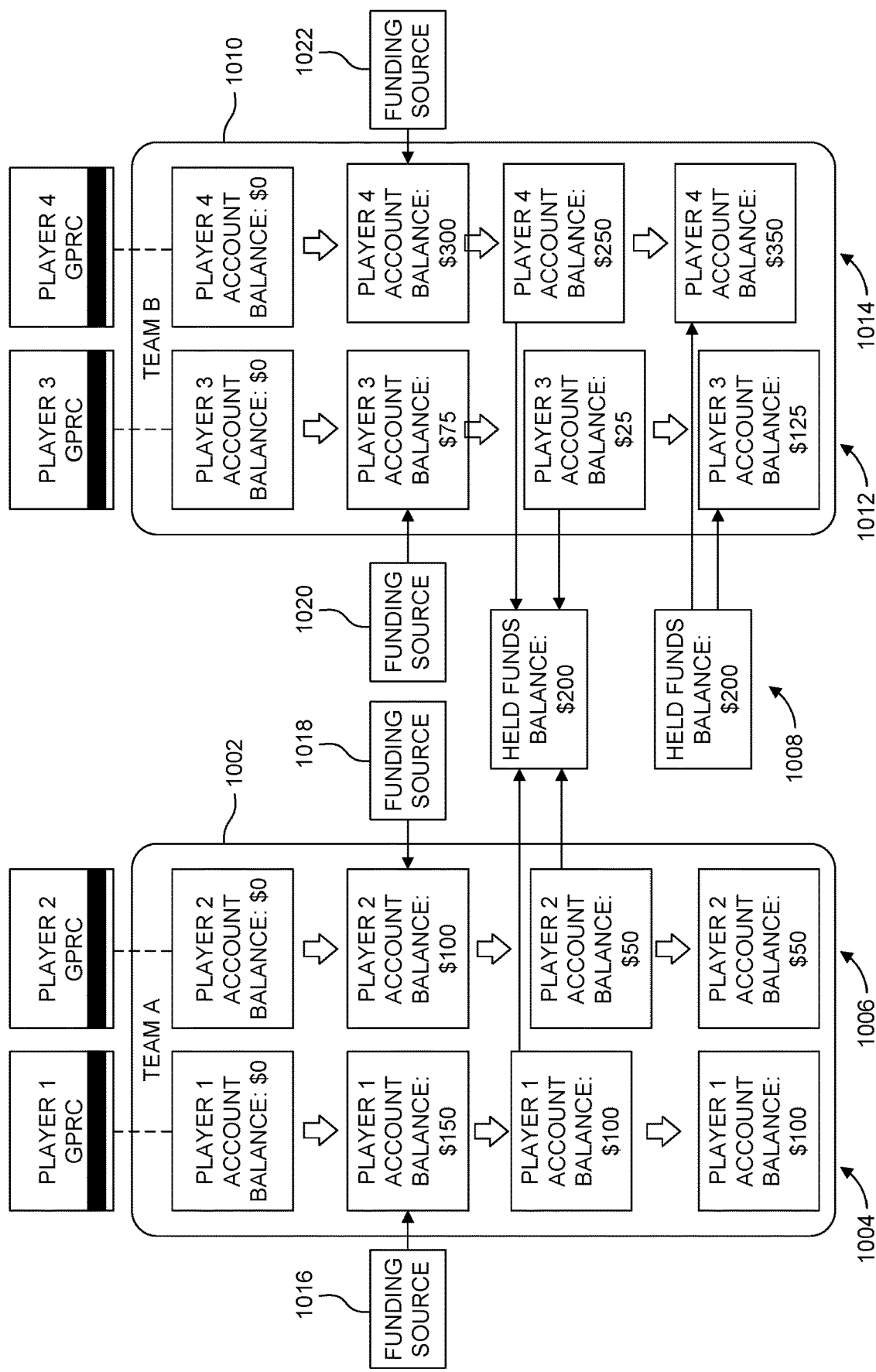

Referring now to FIG. 10, the balances of various accounts over time are depicted in accordance with another non-limiting embodiment. In this embodiment, a team-based implementation is depicted. A first team 1002 (shown as Team A) is associated with player accounts 1004 and 1006. A second team 1010 (shown as Team B) is associated with player accounts 1012 and 1014. Furthermore, each account is associated with a payment vehicle, which can be, for example, a general purpose reloadable card that is usable to access funds held in the player account. In the illustrated embodiment, all of the accounts 1004, 1006, 1012, and 1014 are shown to start with a zero balance. The account 1004 is shown being loaded with $150 from a funding source 1016. The account 1006 is shown being loaded with $100 from a funding source 1018. The account 1012 is shown being loaded with $75 from a funding source 1020. The account 1014 is shown being loaded with $300 from a funding source 1022.

Next, through a contest funds management computing system, all of the players on the team can agree to each fund a purse 1008 with $50, thereby creating a $200 purse. As provided above, the funds associated with the purse 1008 can be held using any suitable technique. Once the outcome of the contest is determined, the funds held in the purse 1008 can be transferred to the accounts of the winning team, shown here as Team B.

Figure 11:
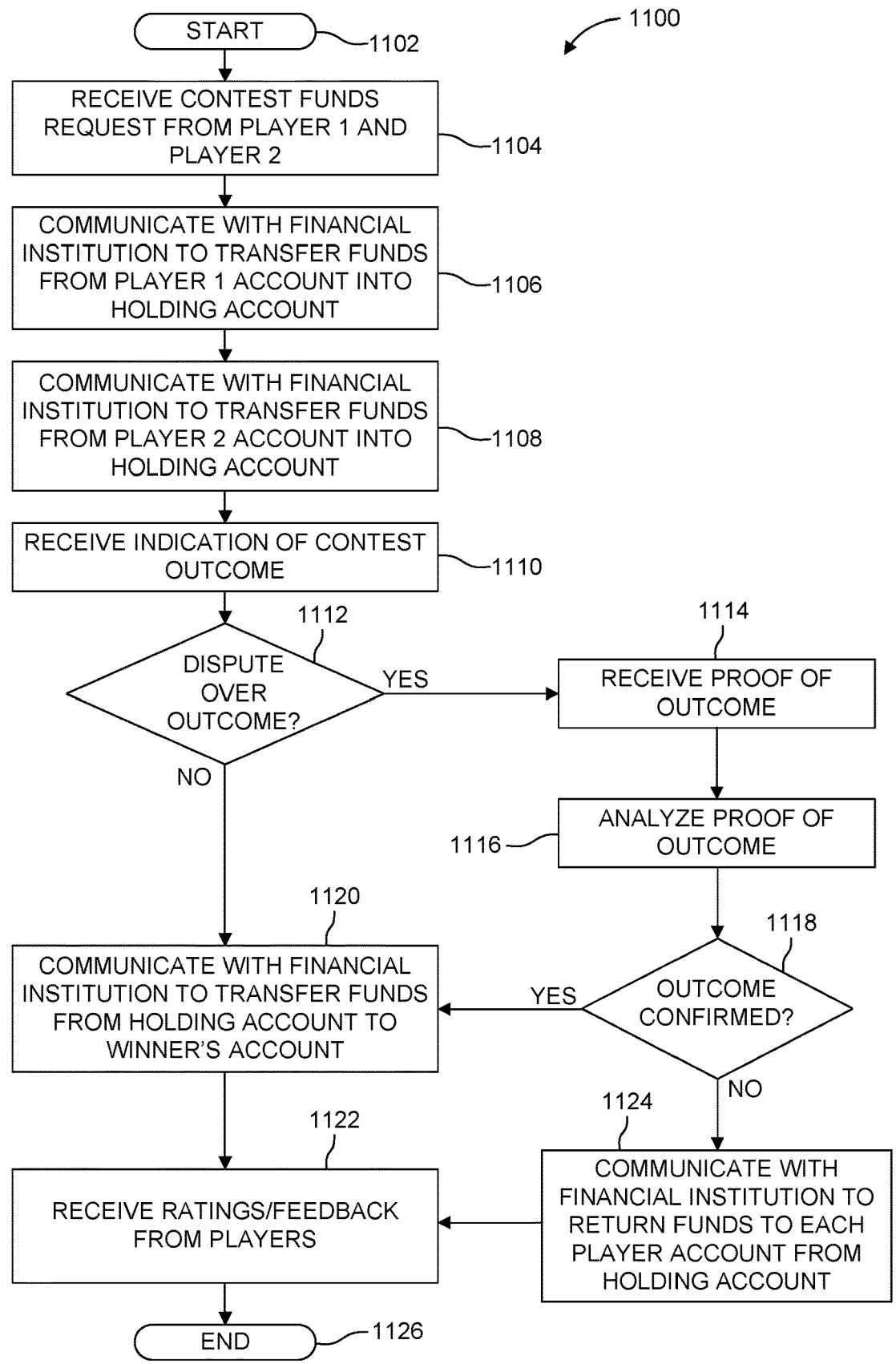

FIG. 11 is an example process 1100 that can be executed by a contest funds management computing system, such as one of the contest funds management computing systems depicted in FIGS. 1-8. The process starts at 1102. At 1104, contest funds requests are received by a contest funds management computing systems from a player 1 and a player 2 in order to initiate the funding of a purse for a contest between those players. At 1106, the contest funds management computing system communicates with a financial institution to transfer funds from player 1 account into a holding account. At 1108, the contest funds management computing system communicates with a financial institution to transfer funds from player 2 account into a holding account. It is to be appreciated, however, that in other implementations different approaches can be used, such as utilizing an authorization hold, or other technique, to fund the contest purse. At 1110, an indication of the contest outcome is received by the contest funds management computing system. At 1112, the contest funds management computing system determines if there is a dispute over the outcome of the contest. If there is no dispute, at 1120, the contest funds management computing system communicates with the financial institution to transfer funds from the holding account to the winner's account. In embodiments utilizing authorization holds, the contest funds management computing system can cause the authorization holds to be released and then transfer funds from the loser's account to the winners account. If there is a dispute, at 1114 the contest funds management computing system can receive proof of the outcome.

The proof of the outcome can vary, but in some embodiments, the player lodging the dispute can upload a screenshot of the video game that shows the outcome of the contest. With regard to using a screenshot of the video game, such screenshot can be collected by a variety of suitable techniques. In one embodiment, the screenshot can be collected directly from the computing device upon which the contest is being held. In other embodiments, the player may be instructed to use a camera on their mobile phone to take a photo of the video game. In some implementations, the camera on the mobile phone (or other computing device) is automatically activated by the contest funds management computing system. Once the camera is automatically activated, the user can collect and transmit an image. Triggering the use of the camera by the contest funds management computing system can reduce the likelihood that the player fraudulently uploads a doctored or otherwise misleading photo as proof of outcome.

At 1116, the contest funds management computing system can analyze the proof of outcome submitted by the player to determine whether it confirms the outcome originally received at 1110. In some embodiments, the analysis is performed manually by personnel. In other embodiments, the analysis is performed automatically, such as by image processing, a machine-learning algorithm, or other analytics. At 1118, if the outcome of the contest is confirmed, the process proceeds to 1120 and the contest funds management computing system communicates with the financial institution to transfer funds from the holding account to the winner's account. If the outcome is not confirmed at 1118, the process proceeds to 1124 and the funds originally contributed to the purse are returned to each of the players. Next at 1122, whether the outcome was confirmed or not, player feedback and ratings can be received from all of the players. Such player feedback and ratings can be viewed by subsequent players accessing the contest funds management computing system. At 1126, the process ends.

In accordance with various embodiments, a contest funds management computing system can maintain records with regard to which players have a history of being disputed as well as records regarding which players have lost disputes brought against. Such players may be purposefully reporting the wrong outcome in an attempt for personal gain and the contest funds management computing system can automatically take action to protect other users of the system. In some embodiments, the contest funds management computing system can actively track each contest that was disputed, track which player lodged the dispute, track which player the dispute was lodged against, and track the outcome of the dispute. A score or other type of metric can be maintained for each player is deemed to have recorded the wrong winner, or otherwise submitted false information. Such score or metric can be presented using any suitable techniques, such as a color code, a numeric score, and so forth. For example, a player may initially start with a green color status. If that player loses a dispute based on the player attempting to report false information, the player can be transitioned to a yellow status. The yellow status is to indicate to others that the player has attempted to report false information. Should that player lose another dispute, the player can be transitioned to a red status. Finally, should that player lose yet another dispute, the player can be transitioned to a black status. While having a black status the player can be blocked from entering into any contests. The player can remain in the black status for a period of time, such as a 6 weeks, 6 months, a year, or other suitable period. In some embodiments, the player can be permanently blocked if the player is transitioned to a black status more than once.

As is to be appreciated, other approaches can be used to track and punish players who attempt to cheat. For example, instead of blocking a player after three dispute losses, in some embodiments, the player may be blocked after few dispute losses. Alternatively, more attempts at cheating may be needed before blocking a player. In any event contest funds management computing systems in accordance with the present disclosure can seek to monitor users for patterns of cheating or deception and automatically take action to limit exposure to other users.

Figure 13:
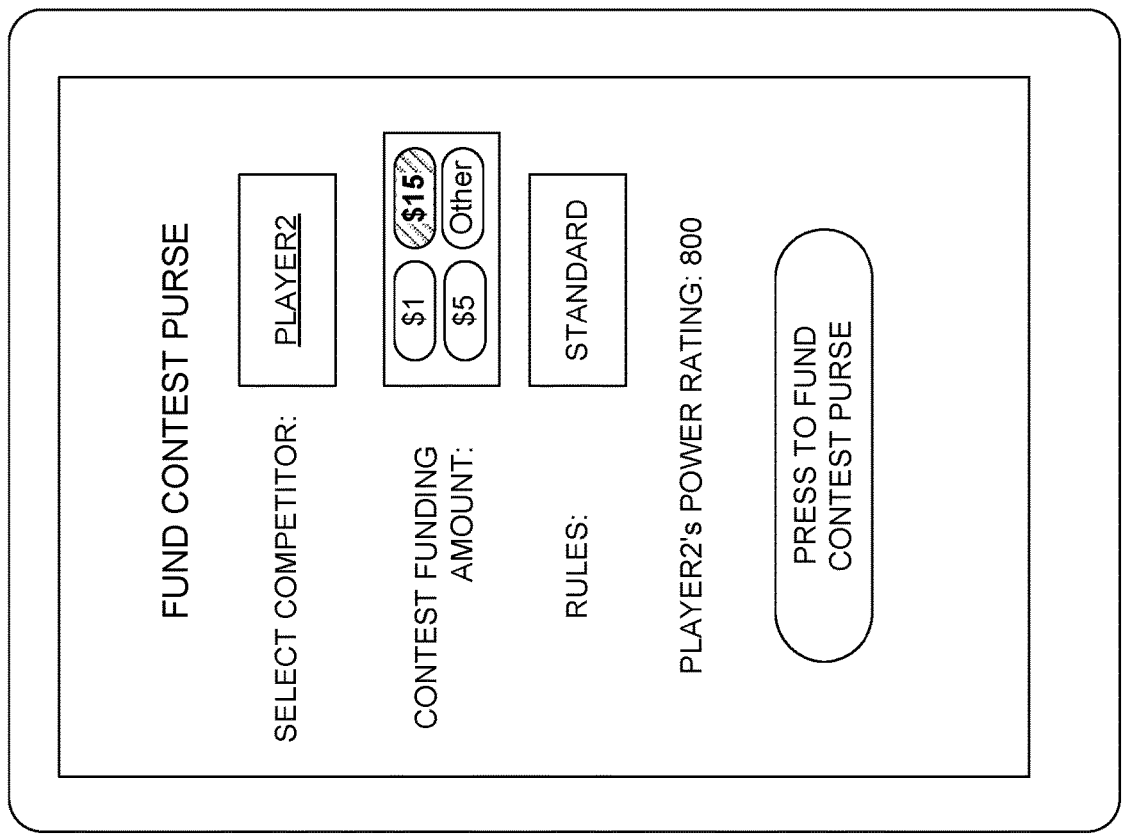
Figure 12:
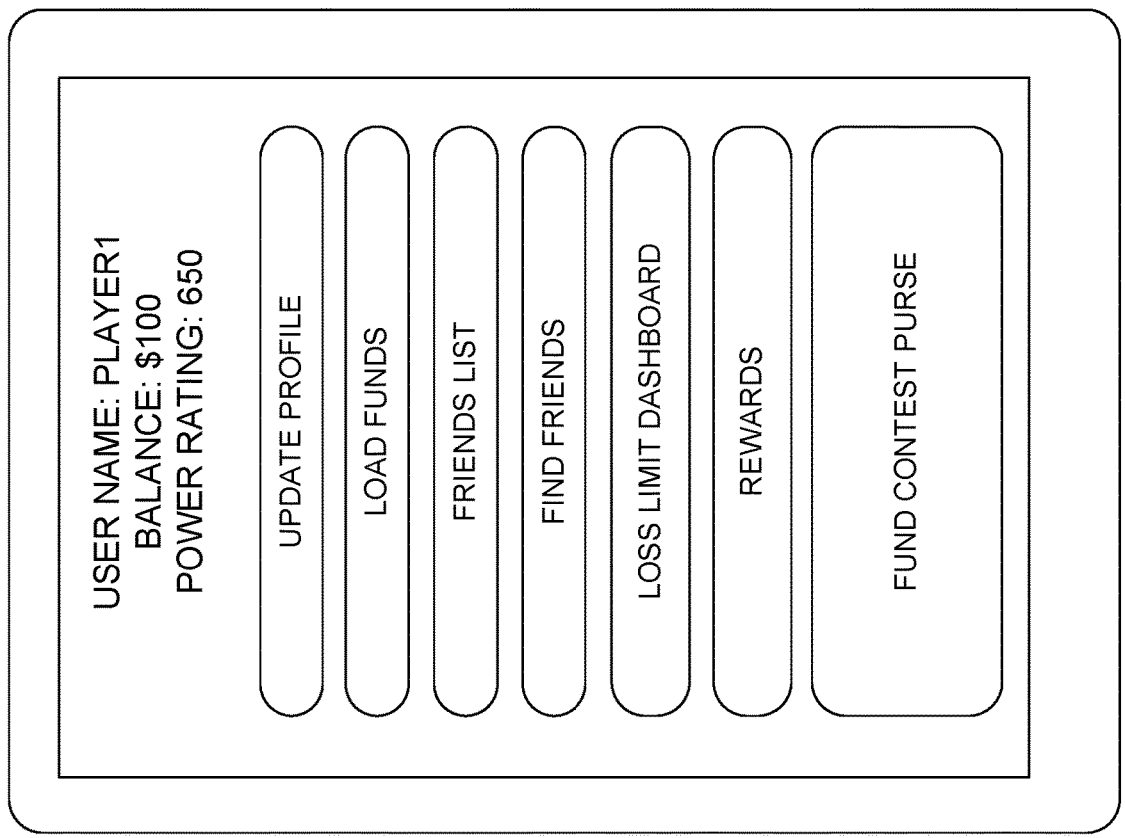

FIGS. 12-20 schematically depict simplified user interfaces that can be provided to a player by a contest funds management computing system. The user interface can be presented to the player on any suitable type of computing device, such as a mobile computing device, a video gaming counsel, and so forth. Referring first FIG. 12, a main menu is depicted. The main menu can provide various options to the player, such as an update profile option, a load funds option, a friends list option, a find friends option, a loss limit dashboard, a rewards option, and a fund contest purse option. With regard to the friends list option and a find friends option, the contest funds management computing system can allow the player to search for other players that utilize the platform. Such searching can be based on mobile phone numbers, email addresses, player IDs, and so forth. FIG. 13 depicts an example user interface that allows a player to enter information to fund a contest purse. As shown, a competitor for the contest can be selected. Here, the competitor is shown as "PLAYER2." Based on this selection, the contest funds management computing system can provide similar interfaces to a computing device associated with that particular player. The player can select the amount of funds that are to be added to the purse. As shown, the interface can include pre-populated funding amounts. Rules governing the competition can be selected and confirmed by the players in the competition. In accordance with various embodiments, a ranking, rating, or other quantified metric associated with the competitor can be provided to the player. In the illustrated example, the competitor is shown to have a "power rating" of 800. This power rating can be used by the player to gauge the level of competitiveness of the competitor before entering into the contest. Once the player has supplied the appropriate information, the purse for the contest can be funded with funds from the player's financial account, as described above.

FIG. 14 depicts a simplified user interface that can be displayed to the player during the competition. As shown, the user interface can provide a summary of the amount of funds submitted by the players to the purse and the total purse amount. The user interface can also identify the rules governing the contest. In this embodiment, the user interface also provides interactive elements to allow the player to provide the contest outcome information to the contest funds management computing system. In some embodiments, the contest funds management computing system can require an input of the contest outcome information from both players before finalizing the payout. In other embodiments, the contest funds management computing system can require an input of the contest outcome information from one of the players before finalizing the payout.

Figure 16:
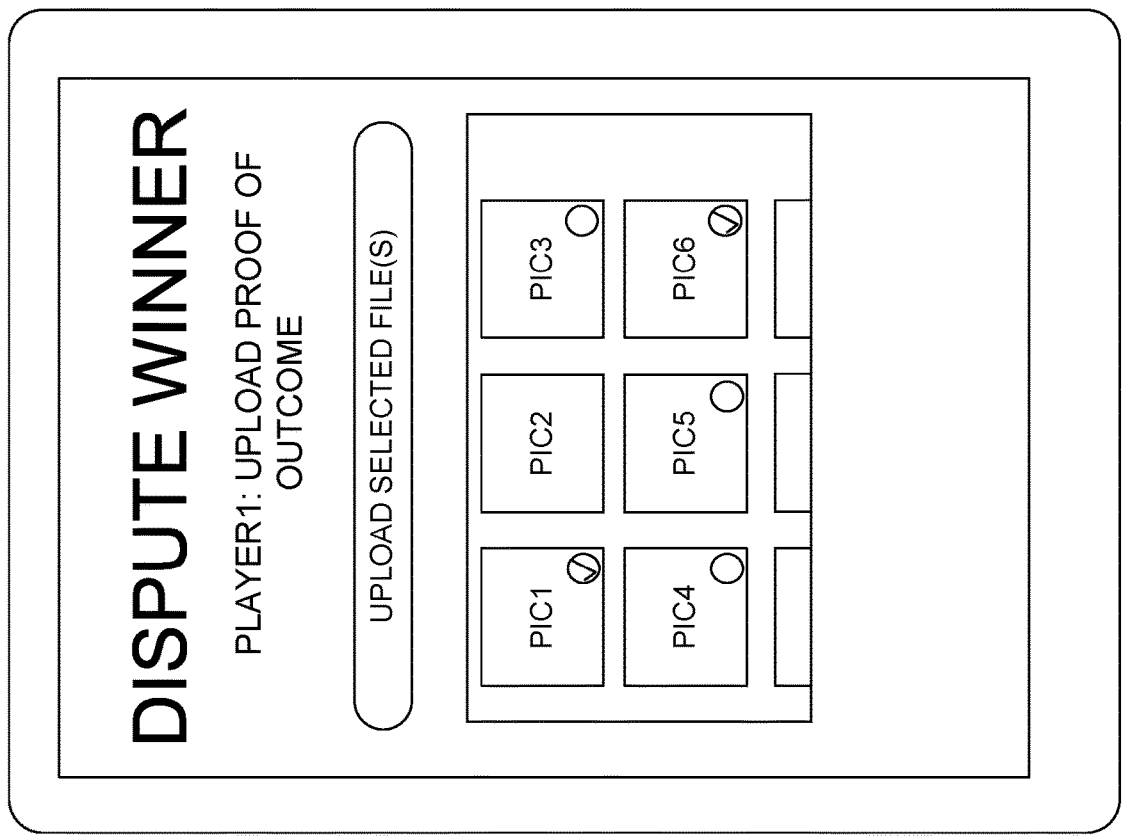

FIG. 15 depicts a simplified user interface that can be displayed to the player subsequent to the contest ending but prior to the paying out the purse to the winner. In the illustrated embodiment, PLAYER2 (i.e., the other player in the competition) is identified as the putative winner. The result can be confirmed or disputed via the interactive elements presented on the user interface. FIG. 16 depicts a simplified user interface that can be displayed to a player disputing the putative winner of a contest. While a variety of techniques can be used to dispute the winner, in one embodiment, the challenger can upload one or more screen shots to establish that the putative winner is not accurate. The screen shots can, for example, show the final score of the contest or otherwise contain other information that can be used to show the putative winner did not win the contest.

Figure 17:
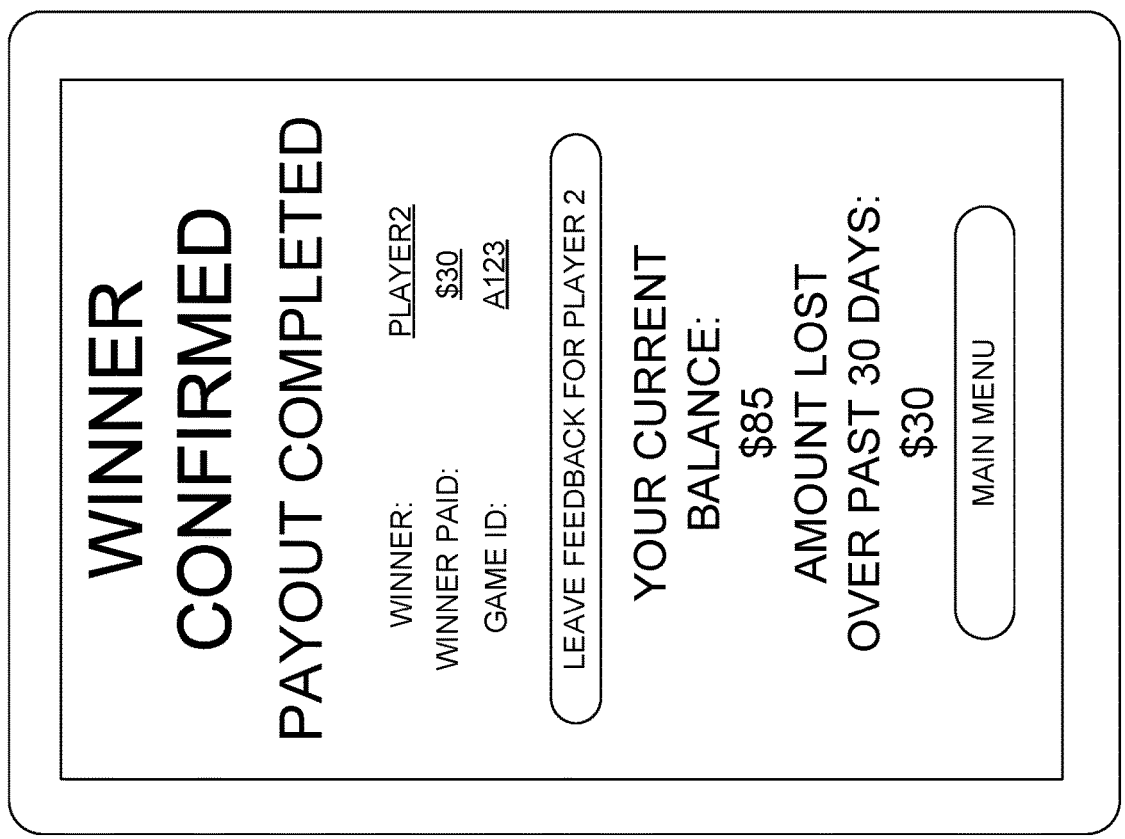

FIG. 17 depicts a simplified user interface that can be displayed to a player subsequent to analysis of the proof of outcome provided by the challenger. As shown, the challenger was not able to overcome the result, and PLAYER2 was confirmed as the winner of the contest. As such, this user interface indicates that PLAYER2 was paid $30 from the purse. A game ID, shown as A123, can be a unique contest tracking identification used by the contest funds management computing system. This example user interface also provides an account balance, which is the amount of funds available to the player as held by a financial account of a financial institution, as described above. This example user interface also provides an indication of the total amount lost by the player over the past 30 days.

Figure 18:
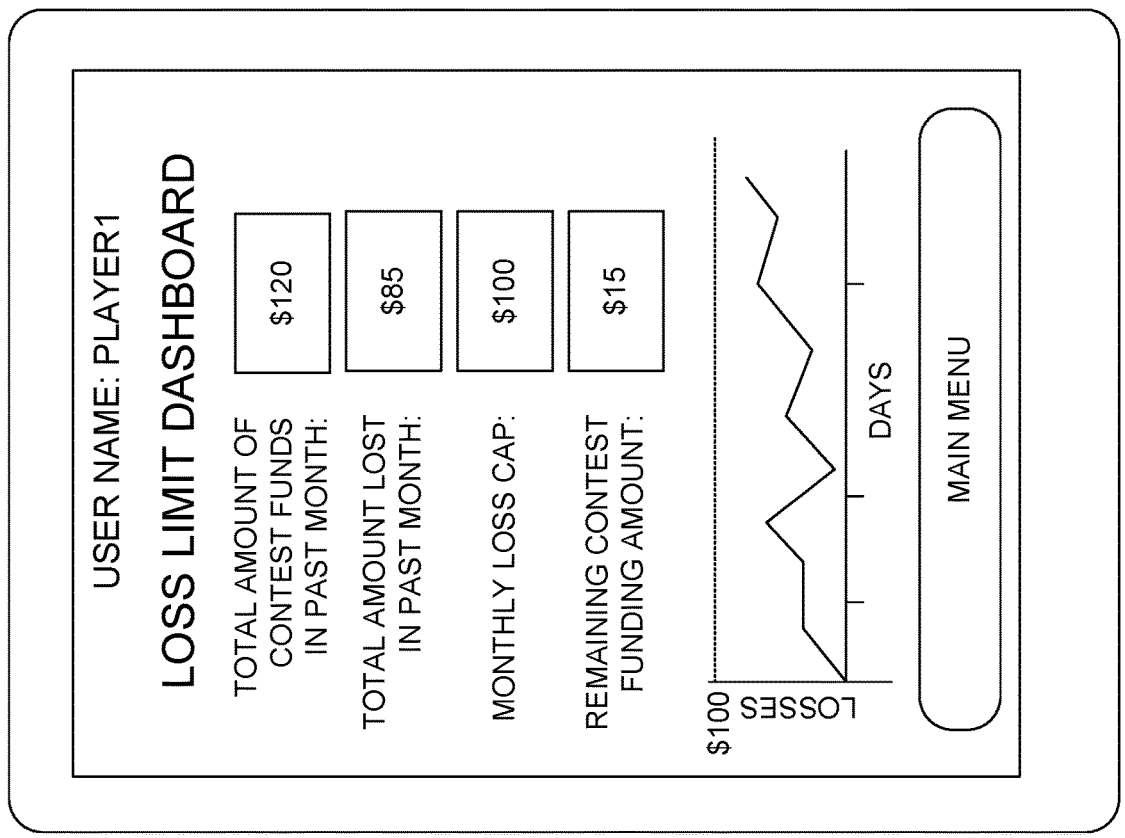

In accordance with various embodiments, the contest funds management computing system can track and display various metrics to the player and limit the player's ability to fund purses based on those metrics. FIG. 18, for example, depicts a simplified loss limit dashboard. The loss limit dashboard provides a tally of the player's activity over a period of time, shown here as over the past month. The loss limit dashboard provides the player with an aggregation of the total amount of funds used for contest purses (shown as $120) as well as the total amount lost in the past month (shown as $85). In the illustrated embodiment, the player has a monthly loss cap of $100, which means the player can no longer fund purses once $100 is lost in a single month. The user interface in FIG. 18 informs the player that only $15 remains before the monthly loss cap is reached.

Figure 19:
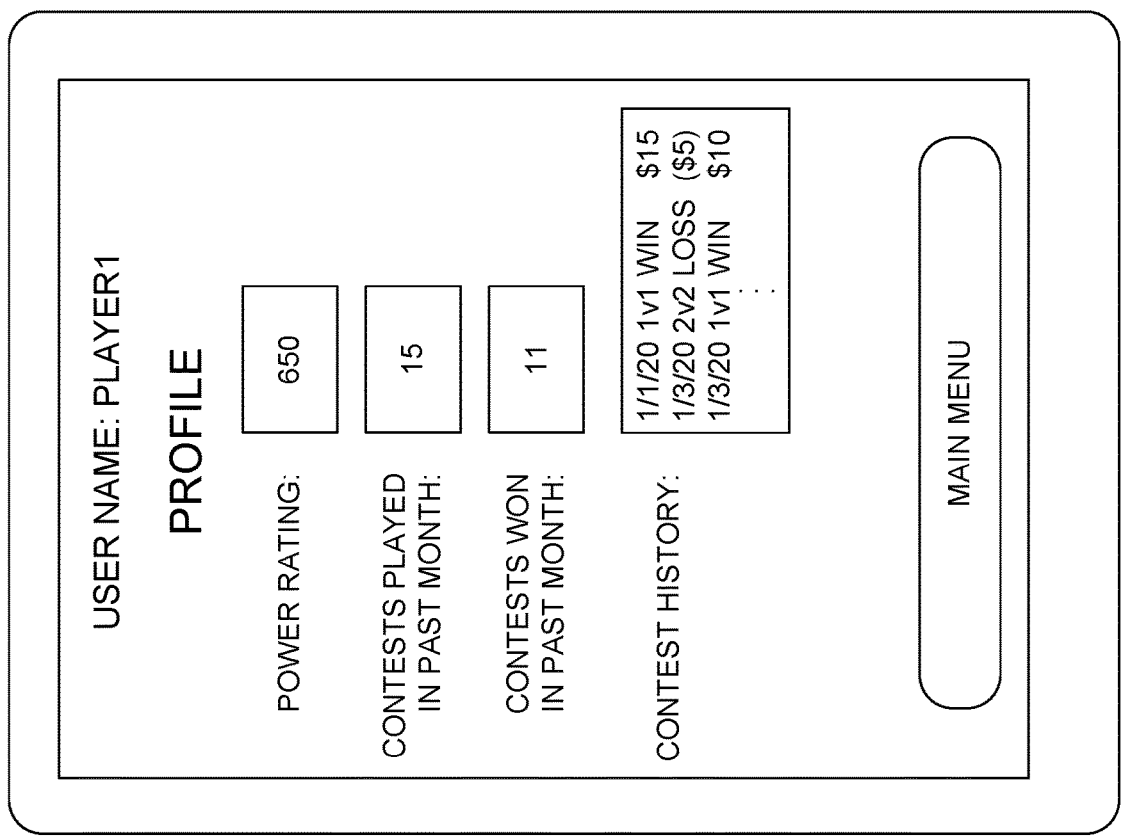

FIG. 19 depicts a simplified user interface showing a profile of the player. The exemplary player profile includes the power rating of the player, the number of contests played in the past month, the number of contests won in the past month, as well as the player's contest history.

Figure 20:
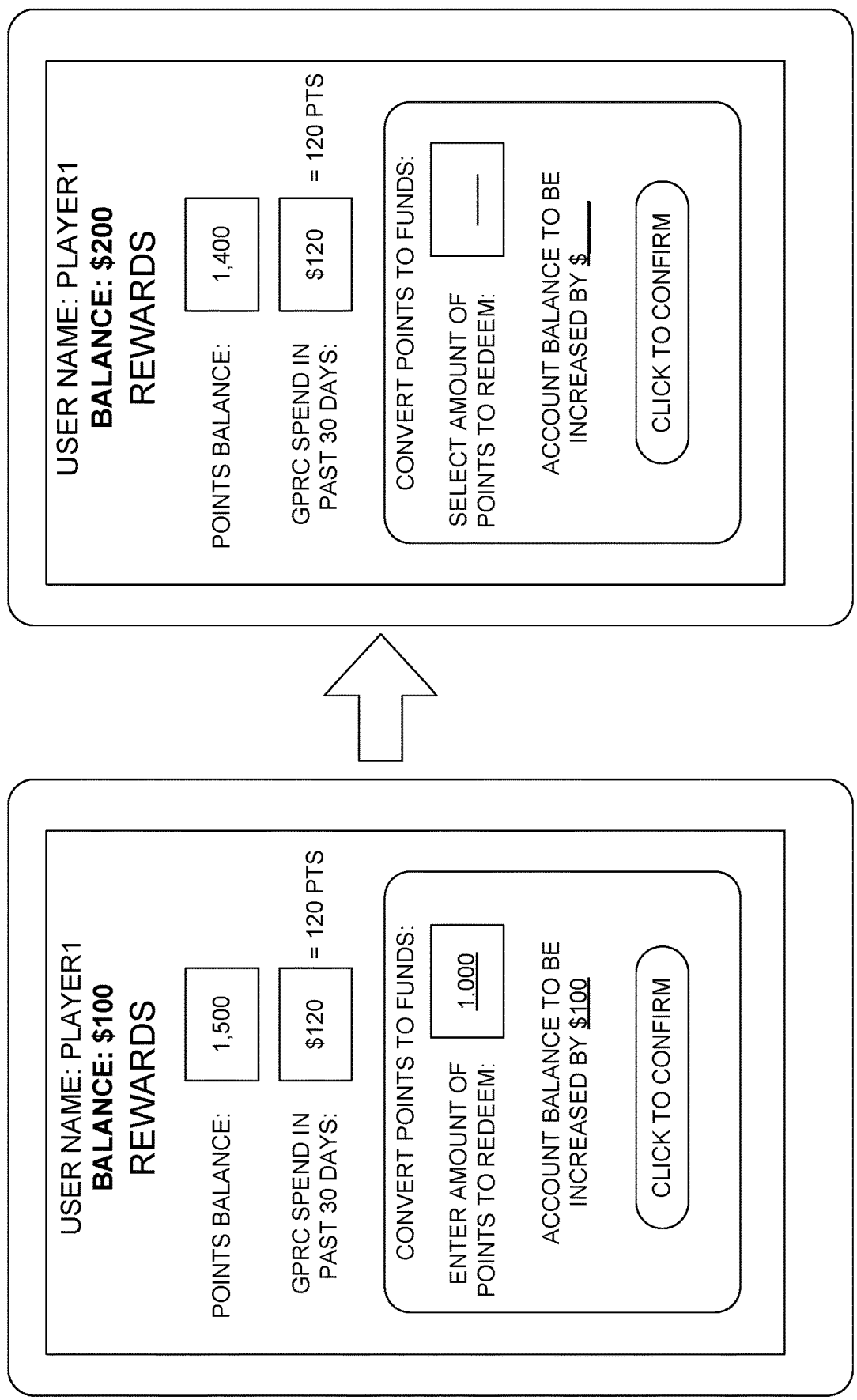

In accordance with various embodiments, a player can accrue loyalty or reward points through the use of their payment vehicle that is tied to their financial account. These points can then be converted into funds that can be used to fund a contest purse or used for additional purchases with the payment vehicle. FIG. 20 schematically depicts a rewards user interface that can be presented to a user. As shown, the player is shown to have an initial balance of $100 in their account. The player also has a balance of 1,500 reward points. In this example implementation, points can be converted to funds at a 10:1 ratio such that 1,000 points are shown be converted to $100. Once the conversion takes places, the account balance is increased from $100 to $200 and the points balance is decreased from 1,500 to 500.

Figure 21:
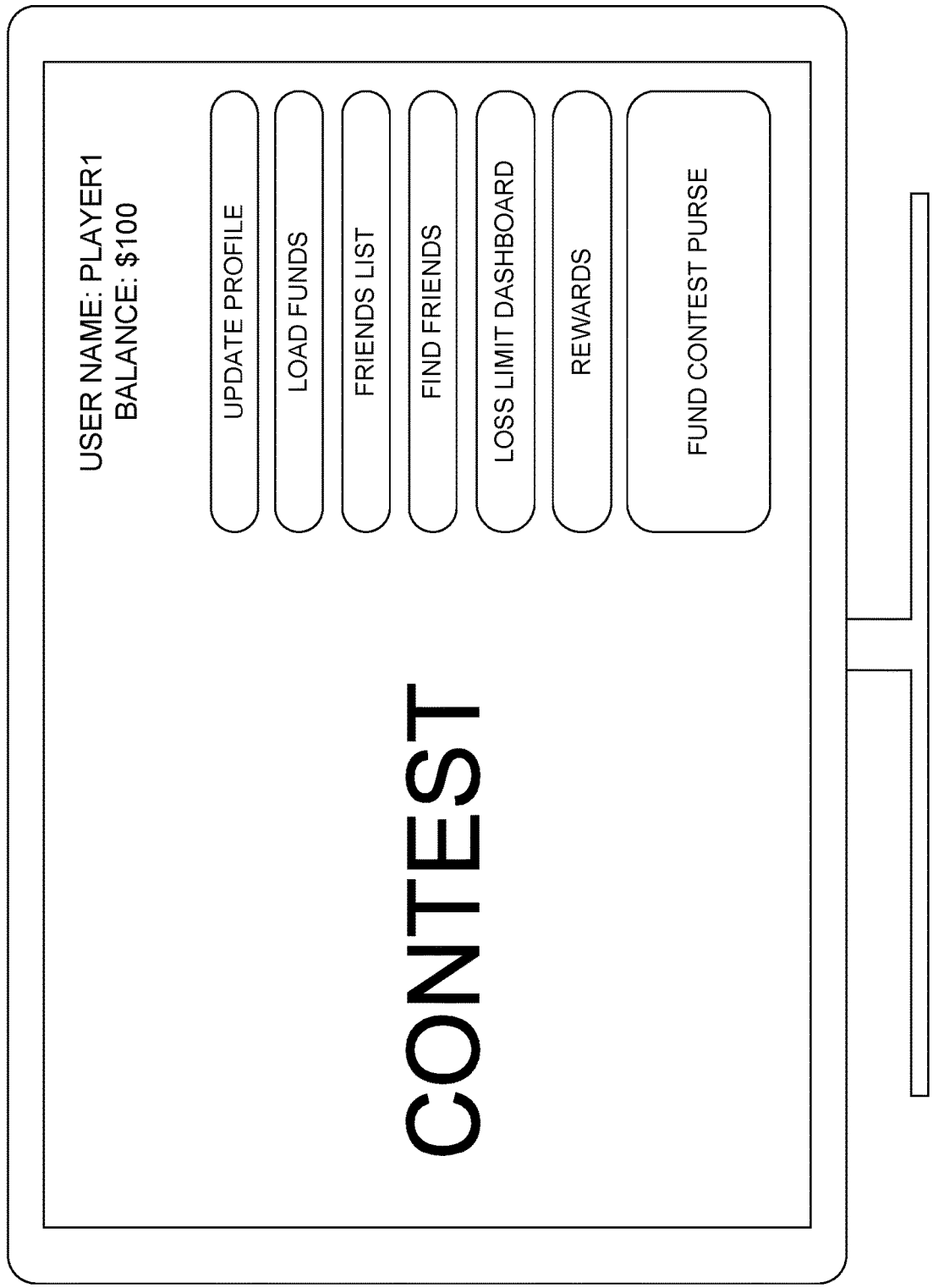

Referring now to FIGS. 21-24, example simplified video game interfaces are depicted that include various menus and screens to facilitate the funding of a purse by players of the video game. The video game can be provided by, for example, the host contest environment 328 or 428, described above. FIG. 21 depicts an example main menu that provides various options to the player, such as an update profile option, a load funds option, a friends list option, a find friends option, a loss limit dashboard, a rewards option, and a fund contest purse option.

Figure 22:
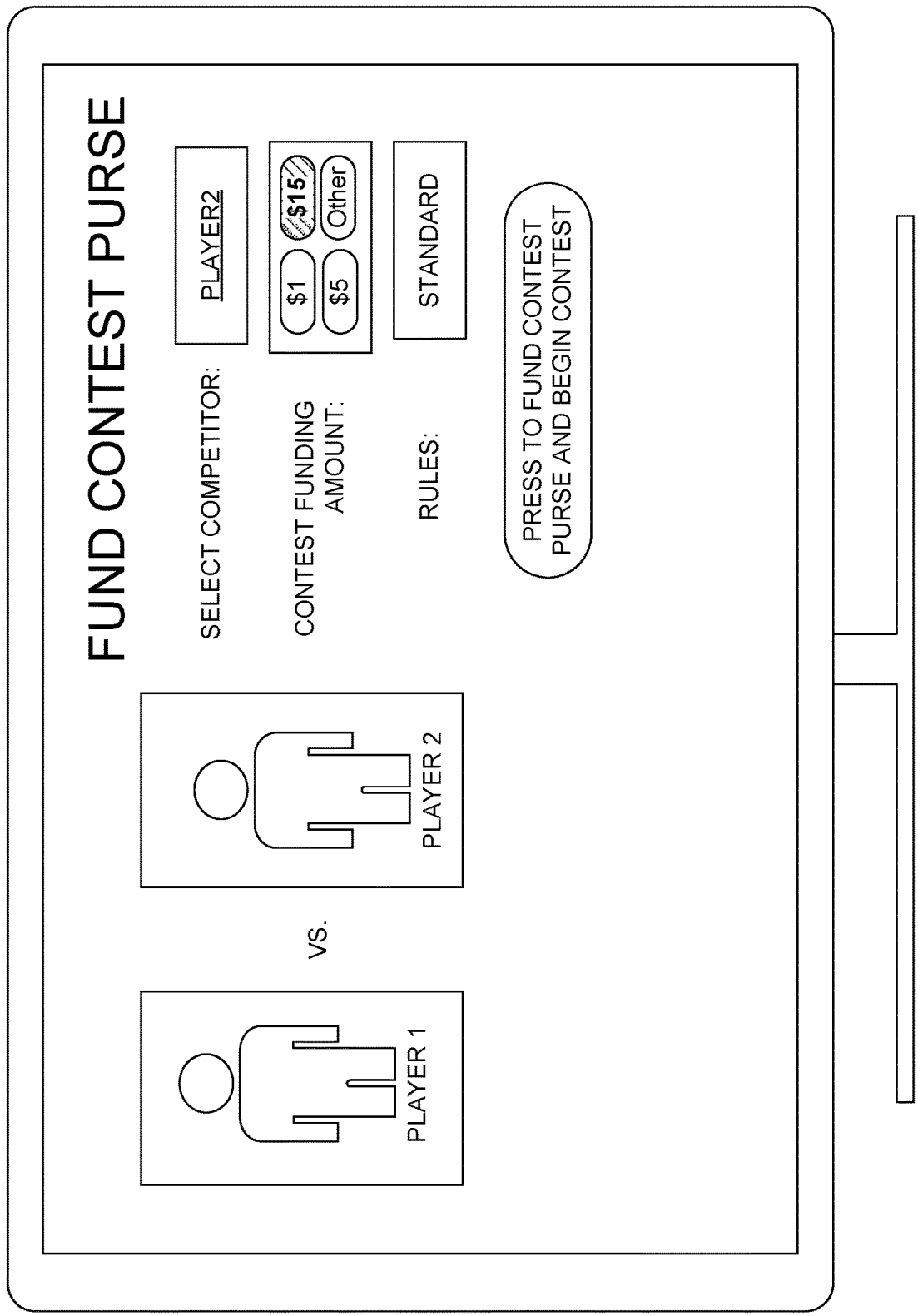
Figure 23:
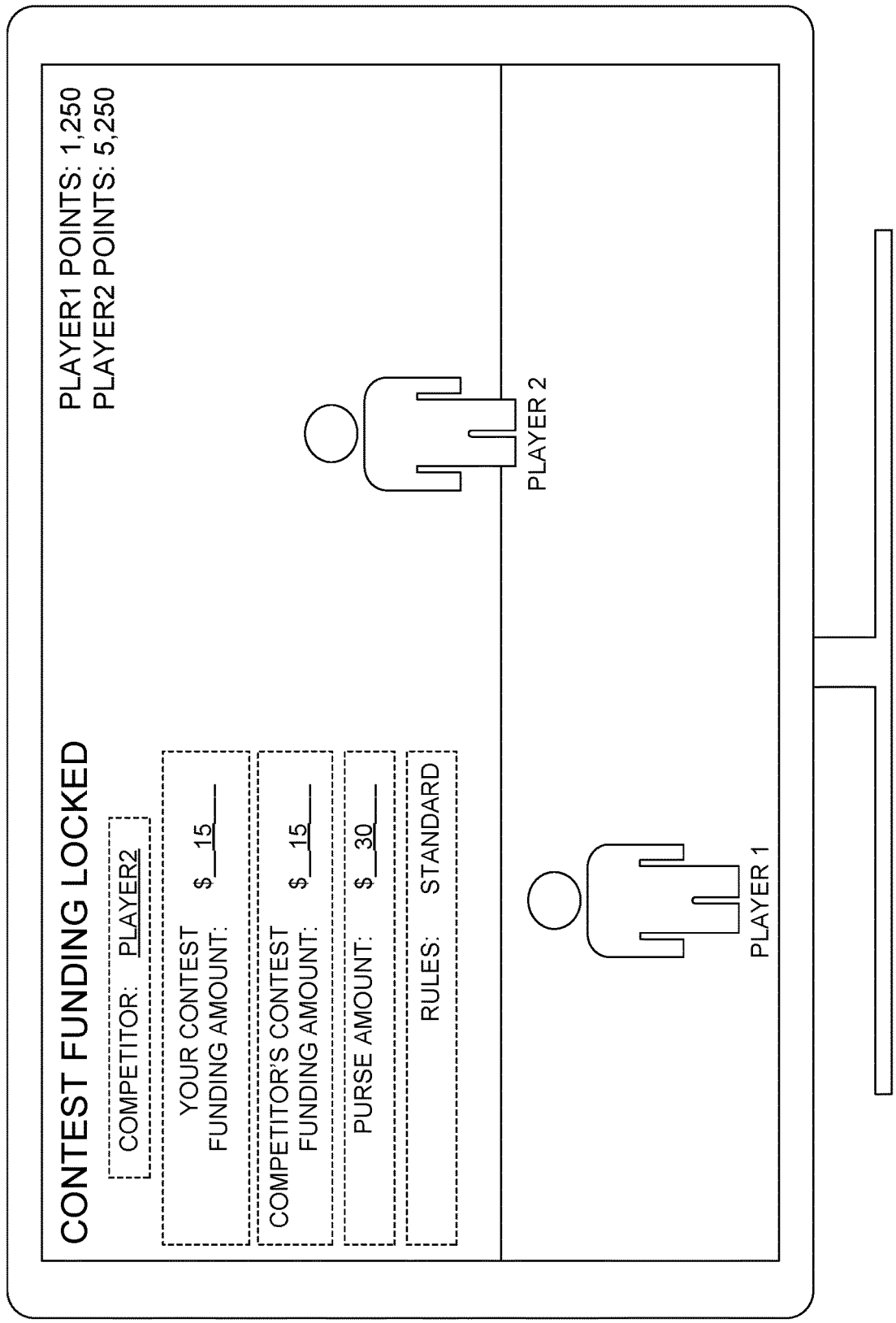

FIG. 22 depicts an example in-game user interface that allows a player to enter information to fund a contest purse. As shown, a competitor for the contest can be selected. Here, the competitor is shown as "PLAYER2." In this embodiment, PLAYER2 is also connected to the same video game via a suitable network connection. Similar interfaces can be provided to that player via their video game console, for example. The player can select the amount of funds that are to be added to the purse. As shown, the interface can include pre-populated funding amounts. Rules governing the competition can be selected and confirmed by the players in the competition. Once the player has supplied the appropriate information, the purse for the contest can be funded with funds from the player's financial account, as described above. FIG. 23 depicts a simplified user interface of the video game that can provide a summary of the amount of funds submitted by the players to the purse and the total purse amount. The user interface can also identify the rules governing the contest.

Figure 24:
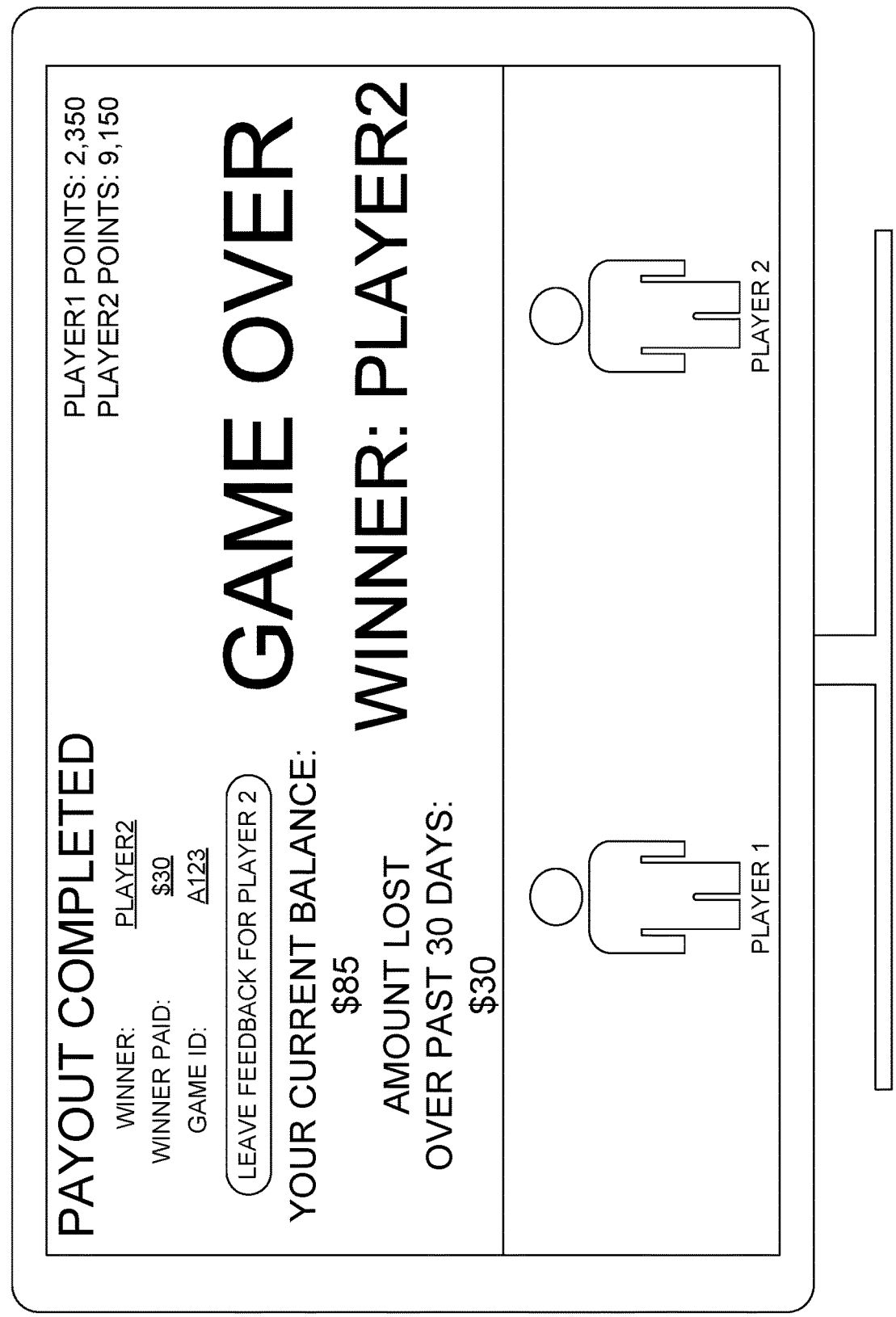
Figure 26:
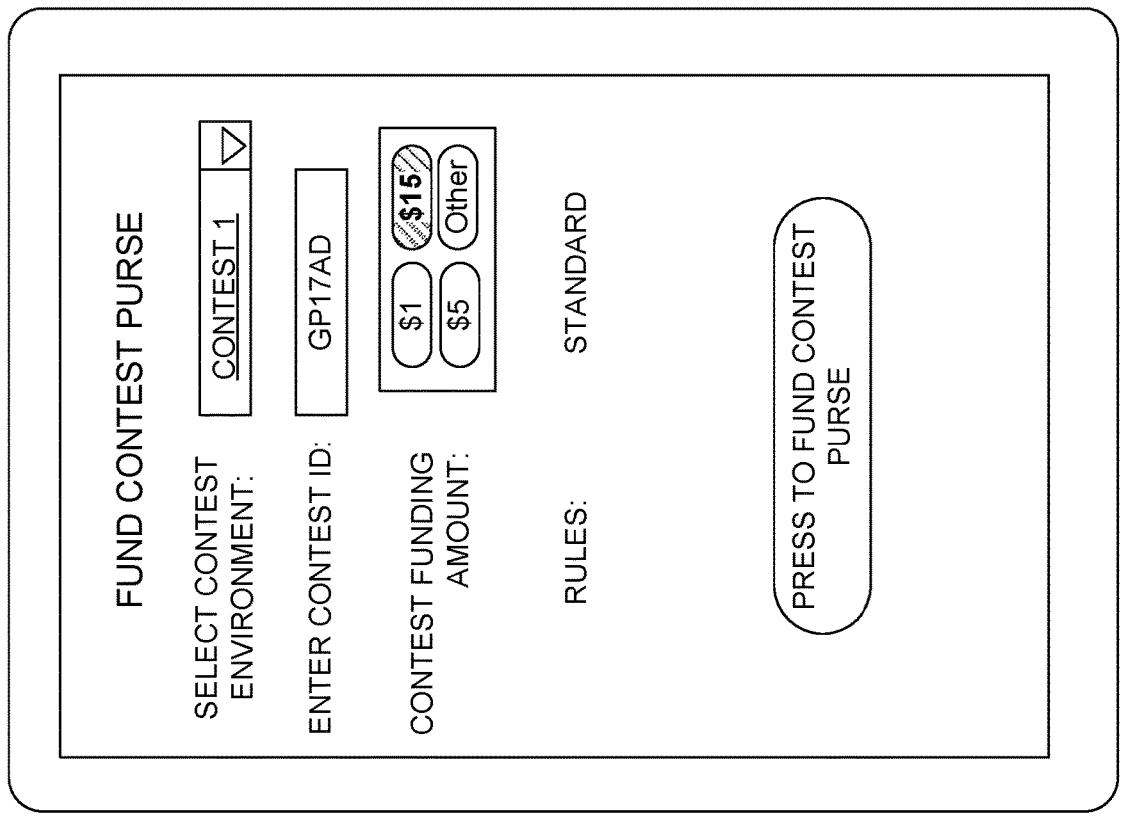
Figure 25:
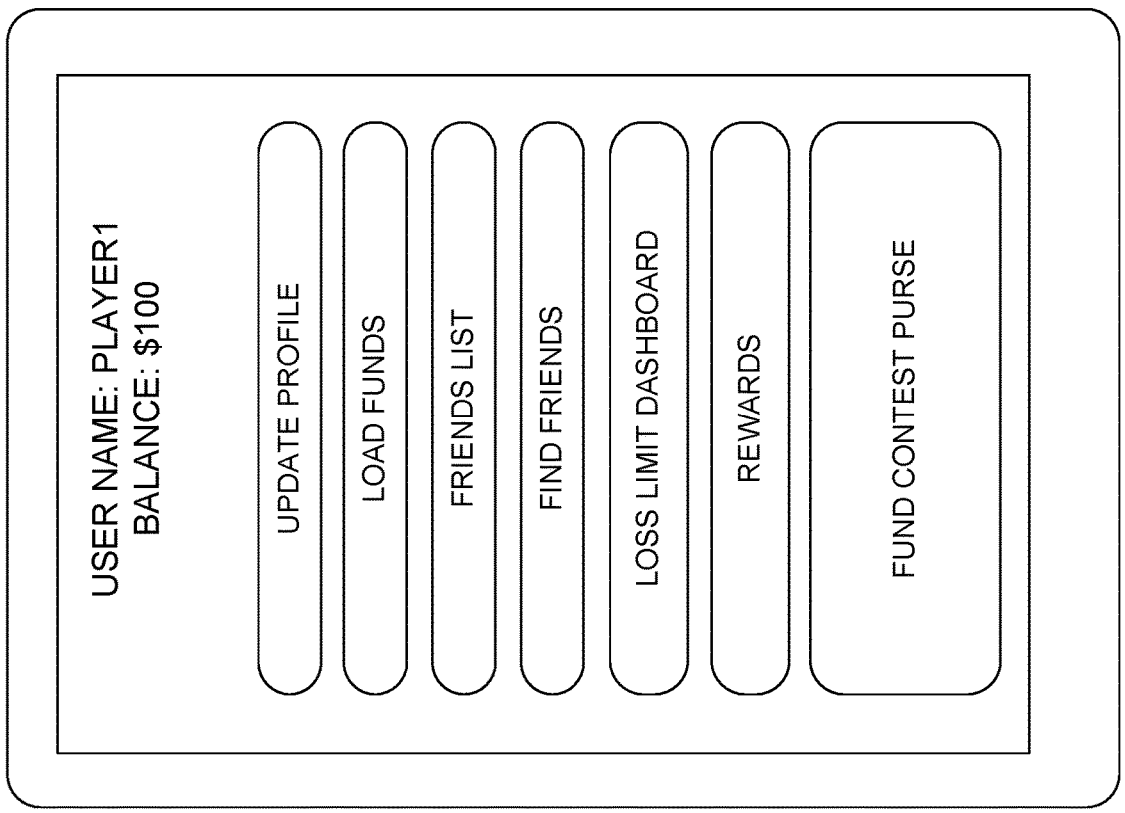
Figure 28:
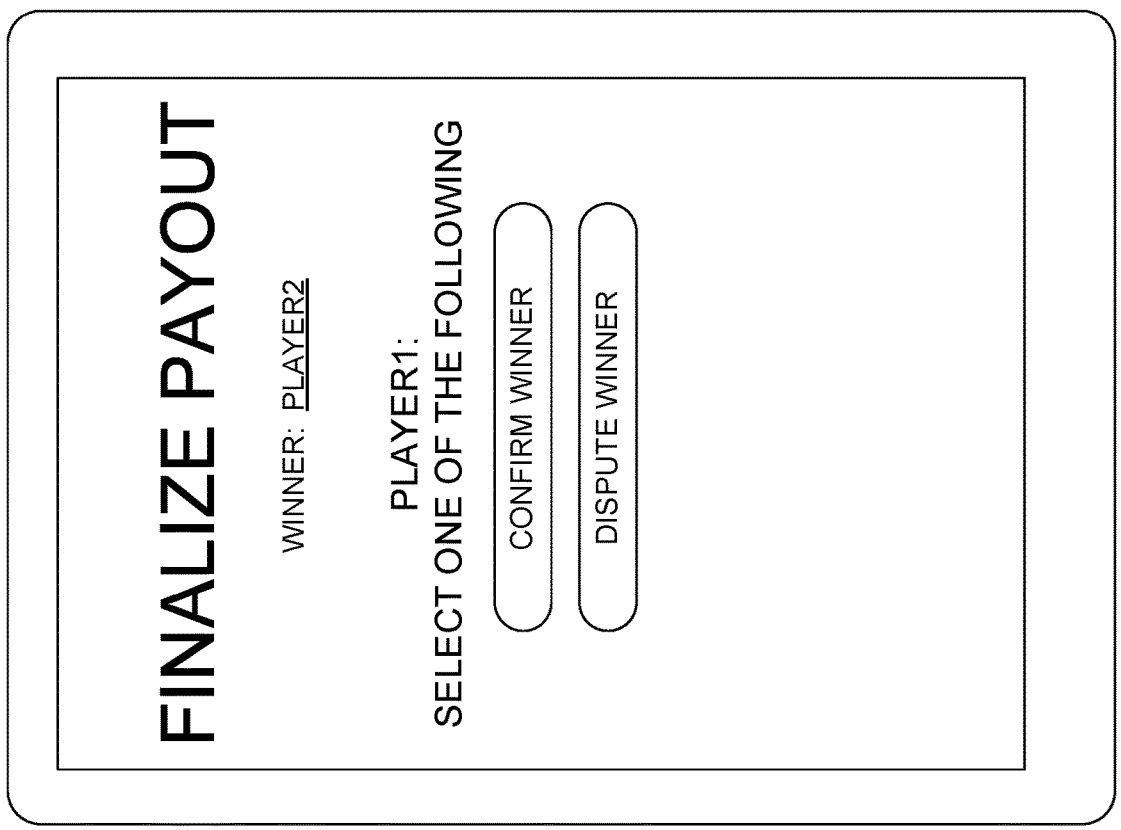

FIG. 24 depicts a simplified user interface that can be displayed to a player subsequent to the contest between the players. This user interface indicates that PLAYER2 was paid $30 from the purse. A game ID, shown as A123, can be a unique contest tracking identification used by the contest funds management computing system. This example user interface also provides an account balance, which is the amount of funds available to the player, as held by a financial account of a financial institution, as described above. This example user interface also provides an indication of the total amount lost by the player over the past 30 days.

Figure 27:
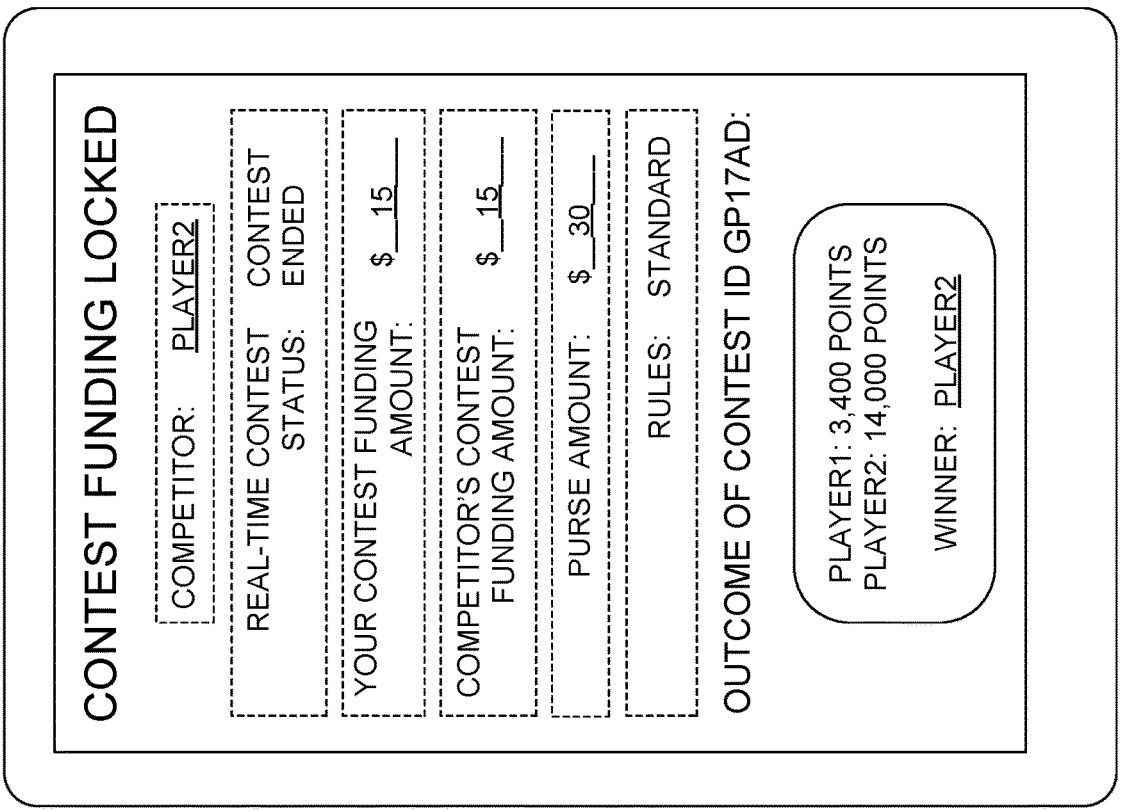
Figure 30:
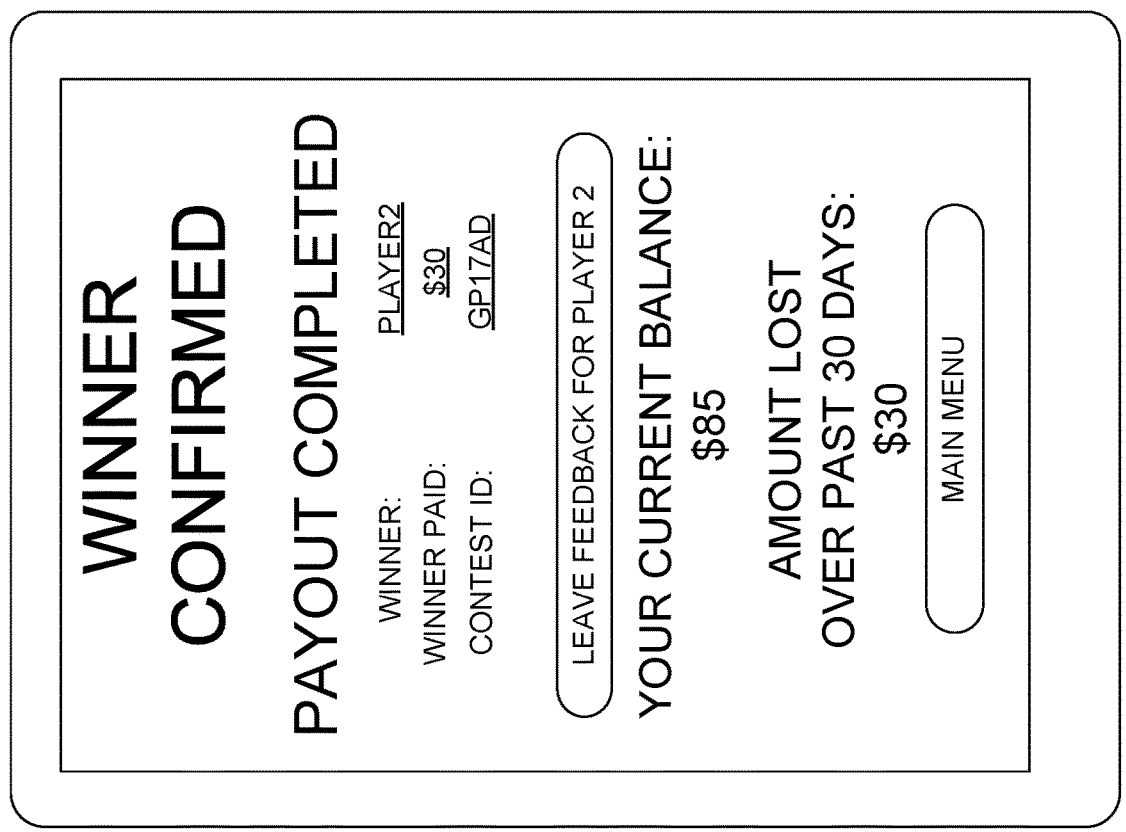
Figure 29:
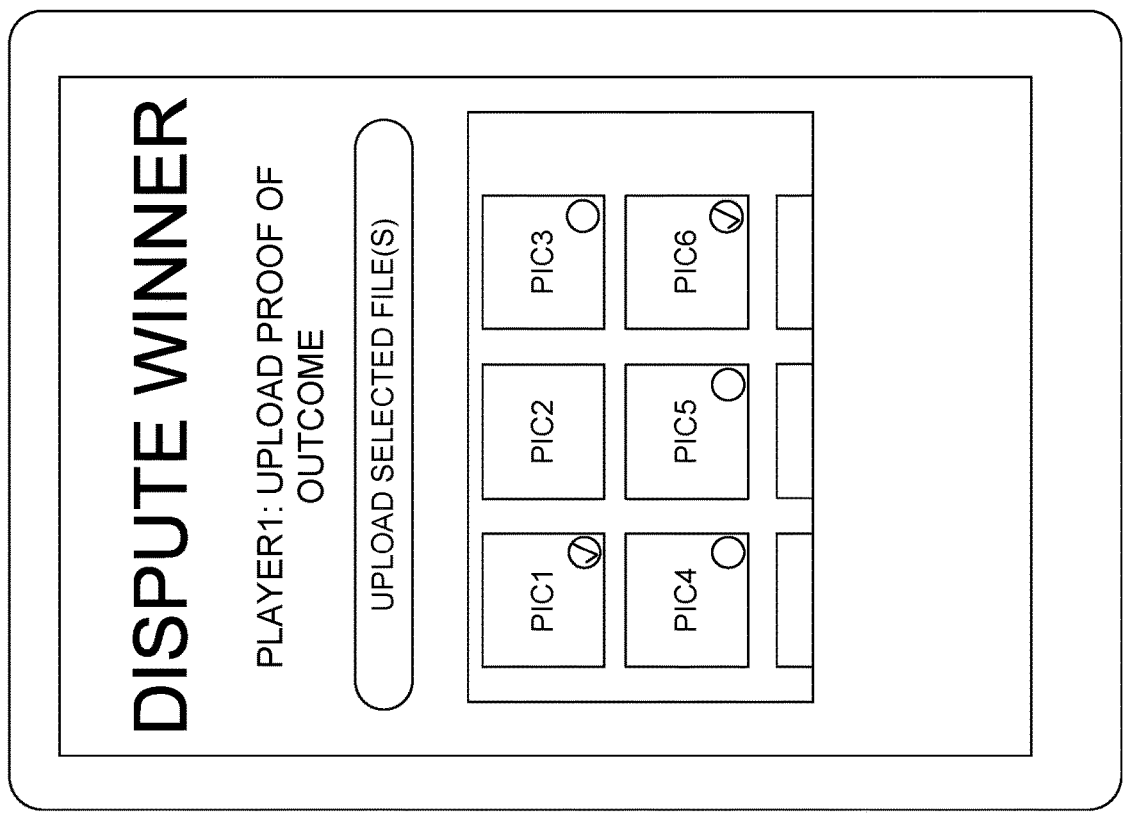

FIGS. 25-30 schematically depict simplified user interfaces that can be provided to a player by a contest funds management computing system. The user interface can be presented to the player on any suitable type of computing device, such as a mobile computing device, a video gaming counsel, and so forth. The interfaces are generally similar to those presented in FIGS. 12-17, however, in this embodiment the contest funds management computing system received contest outcome information from a data feed. Such a data feed can be similar, for example, to the data feed 250 illustrated in FIG. 2. As shown in FIG. 27, a real-time contest status indicates that the contest has ended and that the winner is PLAYER2. Thus, the interface shown in FIGS.

25-30 can be generated by a funds management computing system similar to funds management computing system 200 in FIG. 2.

In some embodiments, contest funds management computing systems can facilitate the matching of a first player wishing to enter into a contest with one or more other players that are willing to enter into the same contest. For instance, a player interacting with the contest funds management computing systems can dispatch an invite to a network of players to identify a competitor. The scope of the invite can vary. In some cases, the invite may only be dispatched to a network of other users that are known to the player. By way of example, the player can dispatch the invite to multiple players in a "friends list" or other type of network the player might belong to and then wait for one of those players to accept the invite. In other cases, the player may dispatch an "open" invite that can be accepted by any user of the platform. In one operational example, a player may first send a direct invite to a particular player to enter a contest. Next, based on that other player either denying the request or otherwise being nonresponsive, the player may then extend the invite to a large group of players (i.e., players in their personal network). If none of those players accept the invitation, the player can then optionally extend an invite to a larger group of players on a first come first serve basis. Thus, the contest funds management computing systems can provide players with multiple approaches finding a willing competitor to enter a contest.

Figure 31:
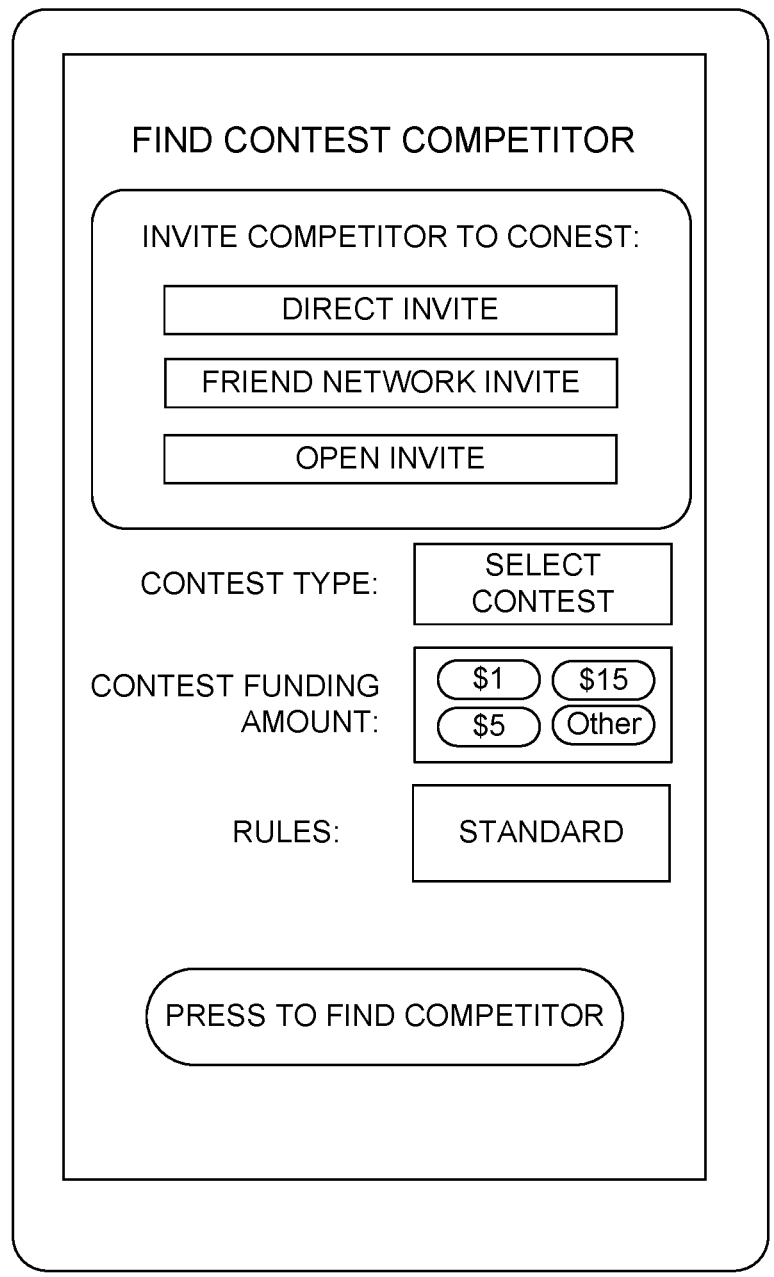

FIG. 31 depicts an example user interface that allows a player to invite a competitor using a variety of different invitation approaches. For instance, the player can select the direct invite option and identify a particular player or set of players to invite to a competition. Alternatively, the player can select the friends network invite option to dispatch an invite to a larger group of players, with the first player to accept the invite being entered into the contest. Finally, the player can select the open network invite option to dispatch the invite to an even larger group of players, such as a general invite to an entire user base, with the first player to accept the invite being entered into the contest.

As shown, the user can identify details of the contest, such as the contest type, contest funding amount, contest rules, and so forth via the example interface. In some embodiments, one or more of the contest details may be decided subsequent to another player accepting the invite. By way of example, a player may send out an open invite for a particular contest type. Once another player accepts the invite, both players can then agree on the contest funding amount, the rules of the contest, and so forth.

Figure 32:
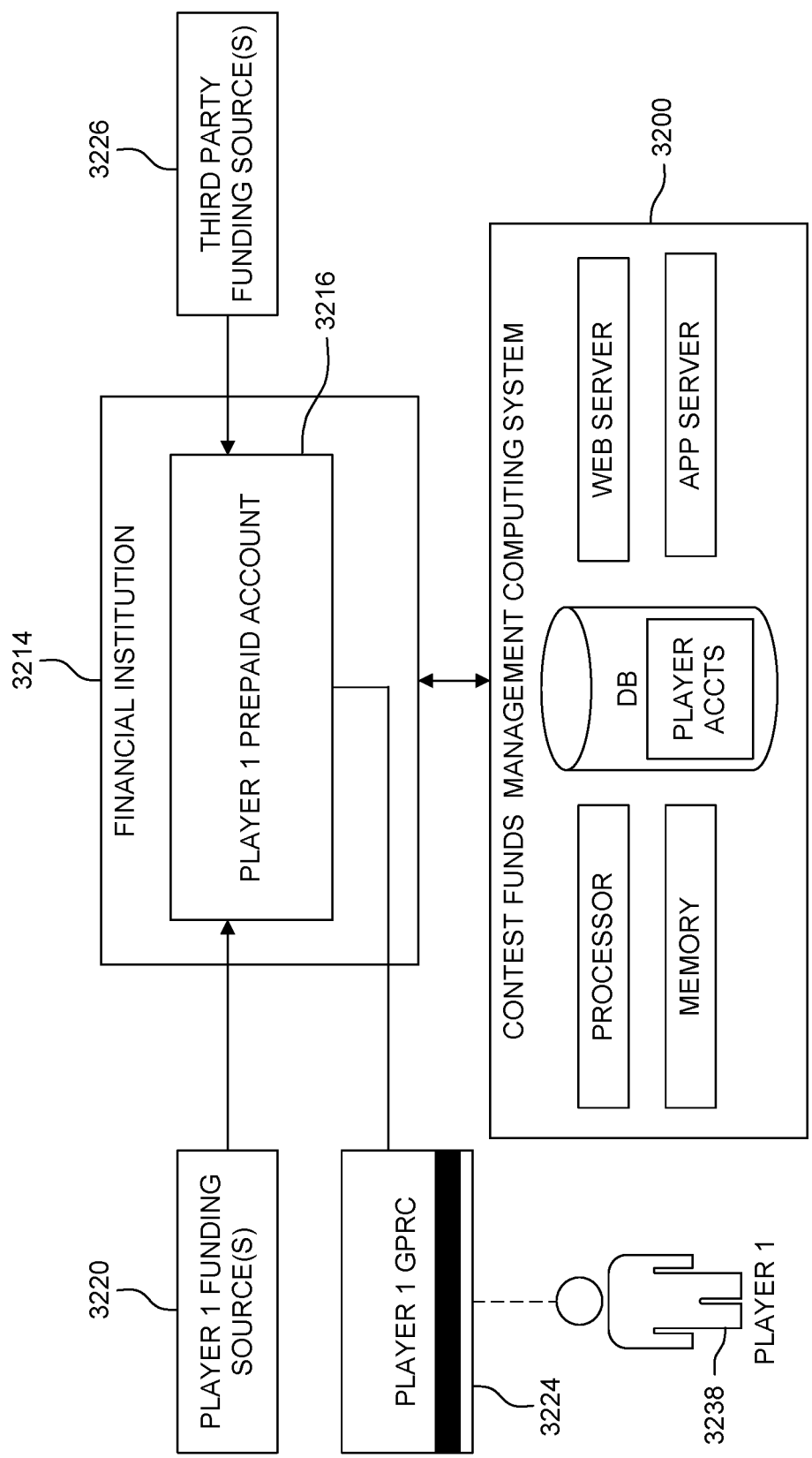
FIGS. 32-33 depict additional examples of contest funds management computing systems in accordance with non-limiting embodiments.

While the previously described embodiments depict player accounts being self-funded, this disclosure is not so limited. Referring now to FIG. 32, an example of funds from a third party being contributing to a prepaid account of a player is depicted. A contest funds management computing system 3200 is depicted that is configured to facilitate funds transfers of funds in account 3216 at a financial institution 3214. Similar to the previous embodiments, the account 3216 can be associated with a player 3238. The player 3238 also can be issued a payment vehicle 3224, which is shown as a general purpose reloadable card in FIG. 32, although this disclosure is not so limited. Similar to previously described embodiments, the player 3238 can load funds into the account 3216 using funds from player funding sources 3220. The funding sources 3220 can include any suitable funding source, such as credit or debit card accounts, checking accounts, savings accounts, prepaid accounts, and so forth. Further, the financial institution 3214 can load funds into account 3216 via any suitable transfer technique, such as intra-bank transfer, automated clearing house (ACH) transfer, and so forth.

As shown, a third party funding source 3226 can be used to load funds into the account 3216. The third party funding source 3226 can, for example, be a gift that is provided to the player 3238 from the third party. The third party funding source 3226 can include any suitable funding source of a third party, such as credit or debit card accounts, checking accounts, savings accounts, prepaid accounts, and so forth. Further, the financial institution 3214 can load funds from the third party funding source 3226 into account 3216 via any suitable transfer technique, such as intra-bank transfer, automated clearing house (ACH) transfer, and so forth.

In some embodiments, the third party contributing the funds can identify the particular player account that is being funded by way of a mobile phone number of the player 3238, an email address of the player 3238, or an account number of the player 3238. In some embodiments, the contest funds management computing system 3200 can generate a one-time code that can be used by the third party to provide funds to the particular player 3238. In any event, a wide variety of funding options are available to fund the account 3216 in accordance with the presently disclosed systems and methods.

Figure 33:
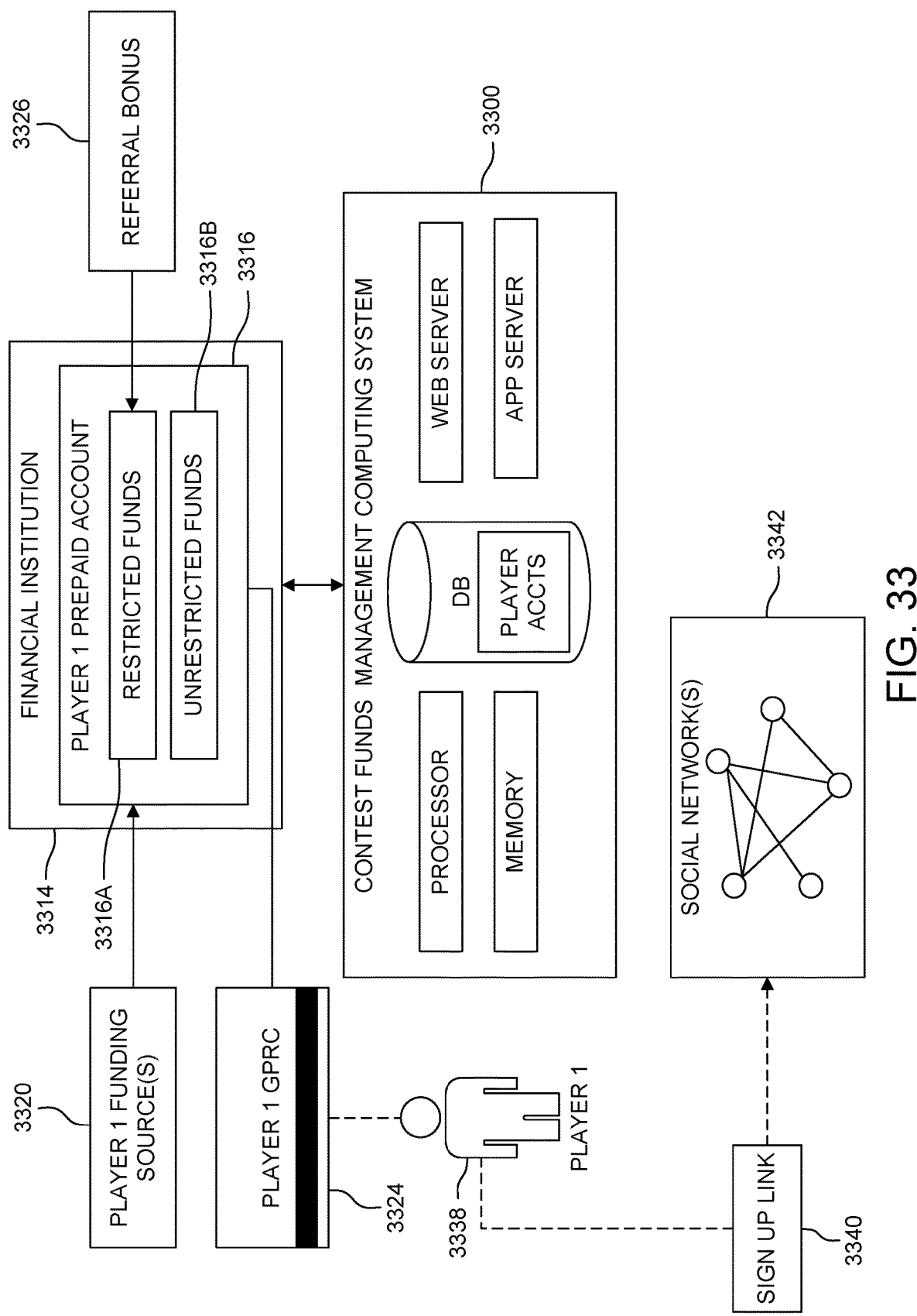

Referring now to FIG. 33, an example technique for encouraging account formation through the sharing of information on social media networks is schematically illustrated. Similar to other embodiments, a contest funds management computing system 3300 is depicted that is configured to facilitate funds transfers of funds in account 3316 at a financial institution 3314. Similar to the previous embodiments, the account 3316 can be associated with a player 3338. The player 3338 also can be issued a payment vehicle 3324, which is shown as a general purpose reloadable card in FIG. 33, although this disclosure is not so limited. Similar to previously described embodiments, the player 3338 can load funds into the account 3316 using funds from player funding sources 3320. The funding sources 3320 can include any suitable funding source, such as credit or debit card accounts, checking accounts, savings accounts, prepaid accounts, and so forth. Further, the financial institution 3314 can load funds into account 3316 via any suitable transfer technique, such as intra-bank transfer, automated clearing house (ACH) transfer, and so forth.

As shown, the player 3338 can optionally post on one or more social networks 3342 a sign-up link 3340. The sign-up link 3340 can be provided in any suitable fashion, as may be dictated by the platform of the social network 3342. For instance, the sign-up link 3340 can promote that the player 3338 just created an account and encourage others to follow suit. The sign-up link 3340 can be uniquely tied to the player 3338 such than when a member of the player's social network 3342 activates the sign-up link 3340 to open an account with the contest funds management computing system 3300, the player 3338 can receive credit for the newly formed account. The credit can be provided to the player 3338 in a variety of suitable formats. In the illustrated embodiment, the player 3338 receives a referral bonus 3326 into their account 3316. The value of the referral bonus 3326 can vary, but in some embodiments, the referral bonus may be in the range of $2-3, although this disclosure is not so limited.

Furthermore, in accordance with the illustrated embodiment, the referral bonus 3326 can be deposited into a restricted funds portion 3316A of the account 3316. Use of the funds in the restricted funds portion 3316A can be limited to certain activities. For example, the funds in the restricted funds portion 3316A can only be usable to fund a contest purse. By comparison, funds in an unrestricted funds portion 3316B (i.e., funds from the funding sources 3320) can be utilized to fund a contest purse and used to make purchases anywhere that the payment vehicle 3324 is accepted for payment.

Contests between players in accordance with the present disclosure can be governed by various contest regulations, such as rules and settings for each particular contest type. To ensure fair play, each player participating in the contest should be playing under the same regulations. In some embodiments, a default set of contest regulations for a particular contest type are set by the contest funds management computing system and are not modifiable by any of the players. Instead, each player of the contest can accept to be bound by the default settings and rules, which can be displayed by the contest funds management computing system to the players via their respective user interface prior to acceptance. The contest funds management computing system can facilitate funds management for a plurality of different types of contests, with each contest type having a default set of rules and settings to which players agree to be governed.

By way of a non-limiting example, the set of default regulations for a 1v1 online football game can be:
Allowed Teams: Any of the current 32 NFL 2019-2020 teams.
Even Teams: Off.
Quarter Length: 5 Minutes.
Weather: Clear. Injuries: Off.
Fatigue: On.
Play Clock: On.
Accelerated Clock: Off.
No blocking field goals and punts/fake field goals and punts/defensive playbooks.
Onside Kicks: 4th quarter only and player onside kicking is losing.
Custom Playbooks: Not allowed
By way of another non-limiting example, the set of default regulations for a 1v1 online basketball game can be:
Game Style: Hall of Fame.
Quarter Length: 6 Mins. Teams:
Current 2019-2020 NBA Teams.

As provided above, in some embodiments, a user of the contest funds management computing system can enter into a contest with a player from their "friends" list or entered into a contest with an unknown player (via an open invite, for example). In some embodiments, when entering into a contest with an unknown player, each player must agree to be governed by the default set of regulations for the particular contest and modification of the regulations is not permitted. Controlling the regulations for each contest can assist with dispute management.

Figure 35:
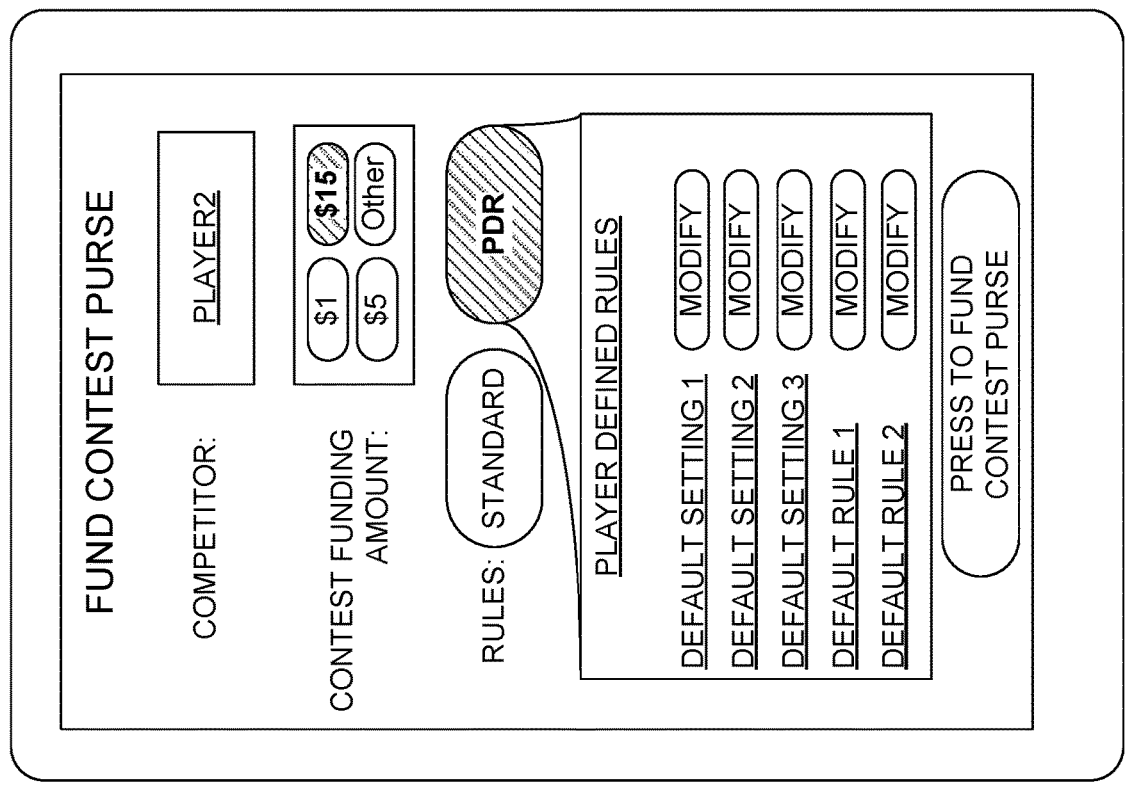
FIGS. 34-35 depict additional example simplified user interfaces in accordance with various embodiments.
Figure 34:
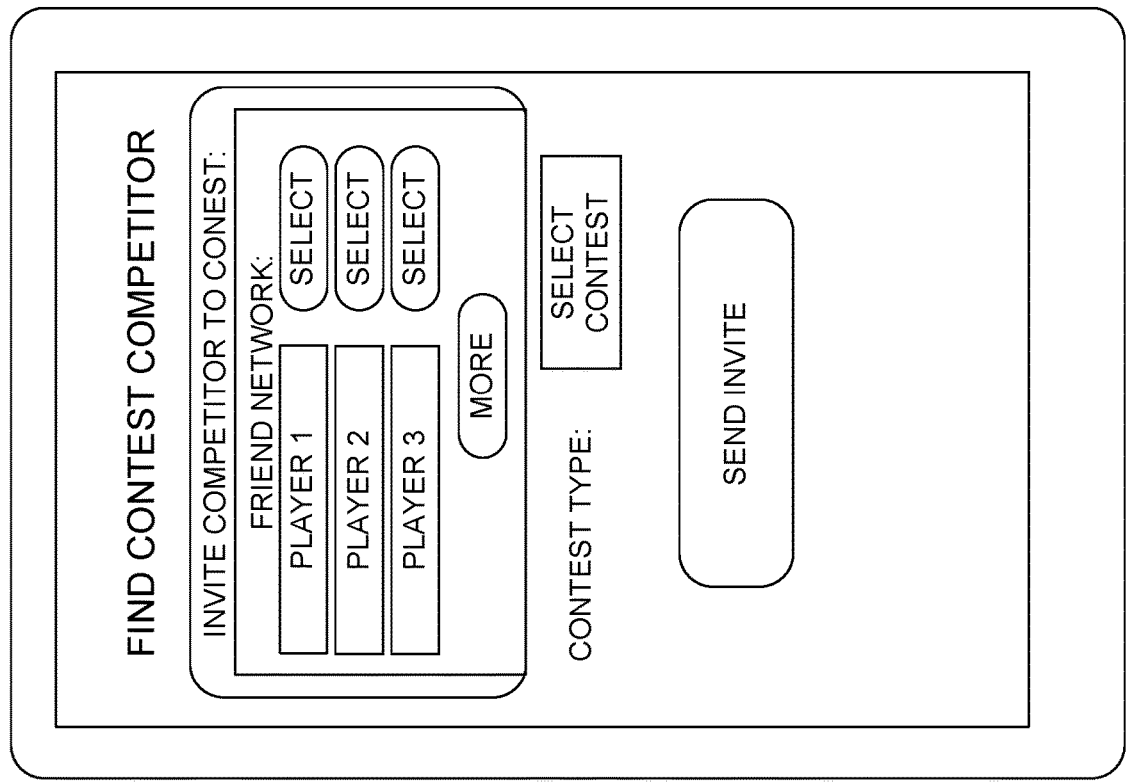

As provided in FIGS. 34-35, in some embodiments, regulations for a particular contest can be modified under certain circumstances, if agreed to by all players. Such modifications to the contest regulations can be referred to as "player defined rules" (PDR), for example. In some embodiments, however, a PDR option is only available when a player enters into a contest with a player from their friends list (i.e., enters a contest with a player that is known to them).

In some embodiments, when PDR is utilized, the players are not permitted to lodge a dispute that is based on the rules or the settings of the contest. Instead, only disputes regarding the winner of the contest can be permitted. As players may agree to a wide variety of different rule and setting variations for any particular contests, limiting disputes only to the winner of the contest can streamline and simplify the dispute process. Further, the tie break rule for PDR can be required to be based on a "skill outcome" as opposed to a coin toss, or other method of chance.

By way of a non-limiting example, the set of PDR regulations for a 1v1 online football game can be:
Allowed Teams: Any of the current NFL 2019-2020 teams except for San Francisco 49er's and Kansas City Chiefs.
Even Teams: Off.
Quarter Length: 5 Minutes.
Weather: Clear.
Injuries: Off.
Fatigue: On.
Play Clock: On.
Accelerated Clock: Off. No blocking field goals and punts/fake field goals and punts/defensive playbooks.
Onside Kicks: 4th quarter only and player onside kicking is losing.
Custom Playbooks: Not allowed.
By way of another non-limiting example, the set of default regulations for a 1v1 online basketball game can be:
Game Style: Hall of Fame.
Quarter Length: 3 Mins.
Teams: Current 2019-2020 NBA Teams except for Golden State Warriors.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A computer-based method of contest funds management, the method performed by one or more computing devices comprising instructions stored in a memory, which when executed by one or more processors of the one or more computing devices, cause the one or more computing devices to perform the method comprising:

storing in computer memory of the one or more computing devices, a first player account for a first player, wherein the first player account is associated with a first prepaid account holding funds, wherein the first prepaid account is associated with a first payment vehicle issued to the first player, and where funds held in the first prepaid account are usable by the first player for payment transactions at any of a plurality of merchants using the first payment vehicle;

storing in computer memory of the one or more computing devices, a second player account for a second player, wherein the second player account is associated with a second prepaid account holding funds, wherein the second prepaid account is associated with a second payment vehicle issued to the second player, and where funds held in the second prepaid account are usable by the second player for payment transactions at any of a plurality of merchants using the second payment vehicle;

communicating with a first player computing device associated with the first player and a second player computing device associated with the second player via network communications;

receiving from at least one of the first player computing device and the second player computing device a contest funds request associated with a contest to be played by the first and second player, wherein the contest funds request identifies an amount of first player contest funds and an amount of second player contest funds;

responsive to receiving the contest funds request, placing a first authorization hold on an amount of funds in the first prepaid account corresponding to the amount of first player contest funds and placing a second authorization hold on an amount of funds in the second prepaid account corresponding to the amount of second player contest funds;

subsequent to the conclusion of the contest, receiving an indication of a winner of the contest, wherein the indication of the winner is entered into at least one of the first player computer device by the first player and the second player computing device by the second player, wherein the winner is either the first player or the second player;

when the first player is indicated as the winner, removing the first and second authorization holds and causing the transfer of funds from the second prepaid account to the first prepaid account, wherein the amount of transferred funds corresponds to the amount of second player contest funds; and when the second player is indicated as the winner, removing the first and second authorization holds and causing the transfer of funds from the first prepaid account to the second prepaid account, wherein the amount of transferred funds corresponds to the amount of first player contest funds.

2. The computer-based method of contest funds management of claim 1, wherein a value of a contest purse associated with the contest corresponds to the combined amount first player contest funds and amount of second player contest funds.

3. The computer-based method of contest funds management of claim 1, wherein each of the first prepaid account and the second prepaid account are maintained by a financial institution.

4. The computer-based method of contest funds management of claim 1, wherein the first payment vehicle is a general purpose reloadable card and wherein the second payment vehicle is a general purpose reloadable card.

5. The computer-based method of contest funds management of claim 1, wherein the first prepaid account is funded from one or more funding sources of the first player and the second prepaid account is funded from one or more funding sources of the second player.

6. The computer-based method of contest funds management of claim 1, wherein the contest is an online video game competition between the first player and the second player, wherein the online video game competition is played on a third party gaming computing system, wherein the third party gaming computing system is not in networked communication with the one or more computing devices.

7. The computer-based method of contest funds management of claim 1, further comprising:

subsequent to receiving the indication of the winner, receiving an indication of a contest dispute and delaying the transferring of funds in the contest until the dispute is resolved.

8. A computer-based method contest funds management, comprising:

storing, by a contest funds management computing system, a plurality of player accounts for each of a plurality of players, wherein each of the plurality of player accounts is associated with a respective prepaid account holding funds, wherein each prepaid account is associated with respective payment vehicle issued to the respective player, and wherein funds held in each of the prepaid accounts are usable for payment transactions at any of a plurality of merchants through use of the payment vehicle associated with the prepaid account;

communicating, by the contest funds management computing system, with a plurality of player computing devices via network communications, wherein the plurality of player computing devices comprises a first player computing device of a first player and a second player computing device of a second player;

receiving, by the contest funds management computing system from each the first player computing device and the second player computing device a contest funds request associated with a contest to be played by the first and second players, wherein the contest funds request from the first player computing device identifies an amount of first player contest funds and the contest funds request from the second player computing device identifies an amount of second player contest funds;

causing, by the contest funds management computing system, a first authorization hold to be placed on an amount of funds in a first prepaid account corresponding to the amount of first player contest funds and a second authorization hold to be placed on an amount of funds in a second prepaid account corresponding to the amount of second player contest funds wherein the first and second prepaid accounts are associated with each of the first and second player, respectively;

subsequent to the conclusion of the contest, receiving, by the contest funds management computing system, an indication of a winner of the contest, wherein the indication of the winner is entered into at least one of the first player computer device by the first player and the second player computing device by the second player, wherein the winner is either the first player or the second player;

when the first player is indicated as the winner, causing, by the contest funds management computing system, removal of the first and second authorization holds and the transfer of funds from the second prepaid account to the first prepaid account; and when the second player is indicated as the winner, causing, by the contest funds management computing system, removal of the first and second authorization holds and the transfer of funds from the first prepaid account to the second prepaid account.

9. The computer-based method of contest funds management of claim 8, wherein a value of a contest purse corresponds to the combined amount first player contest funds and amount of second player contest funds.

10. The computer-based method of contest funds management of claim 8, wherein each of the plurality of player accounts are maintained by a financial institution.

11. The computer-based method of contest funds management of claim 8, wherein the first payment vehicle is a general purpose reloadable card and wherein the second payment vehicle is a general purpose reloadable card.

12. A contest funds management system, comprising:
   a financial institution maintaining funds in a first prepaid account for a first player and funds in a second prepaid account for a second player wherein the first prepaid account is associated with a first payment vehicle issued to the first player and the second prepaid account is associated with a second payment vehicle issued to the second player;
   a contest funds management computing system in networked communication with the financial institution, the contest funds management computing system comprising instructions stored in a memory, which when executed by one or more processors of the contest funds management computing system, cause the contest funds management computing system to:
      store in the computer memory a first player account for the first player, wherein the first player account is associated with the first prepaid account;
      store in the computer memory a second player account for the second player, wherein the second player account is associated with a second prepaid account;
      communicate with a first player computing device and a second player computing device via network communications;
      receive a contest funds request, wherein the contest funds request is associated with a contest to be played by the first and second player, wherein the contest funds request identifies an amount of first player contest funds and an amount of second player contest funds at stake in the contest between the first player and the second player;
      responsive to receiving the contest funds request, place a first authorization hold on an amount of funds in the first prepaid account corresponding to the amount of first player contest funds and place a second authorization hold on an amount of funds in the second prepaid account corresponding to the amount of second player contest funds;
      subsequent to the conclusion of the contest, removing the first and second authorization holds and causing either (i) the transfer of funds from the second prepaid account to the first prepaid account if the first player won the contest or (ii) the transfer of funds from first prepaid account to the second prepaid account if the second player won the contest.

13. The contest funds management system of claim 12, wherein an indication of an outcome of the contest is received by the contest funds management computing system from at least one of the first player computing device and the second player computing device via network communications.

14. The contest funds management system of claim 12, further comprising a hosted contest environment and wherein the contest funds request is associated with an online video game competition between the first player and the second player in the hosted contest environment.

15. The contest funds management system of claim 14, wherein the hosted contest environment is not in communication with the contest funds management computing system.

16. The contest funds management system of claim 14, wherein the hosted contest environment comprises the contest funds management computing system.

* * * * *

UNITED STATES PATENT AND TRADEMARK OFFICE
CERTIFICATE OF CORRECTION

PATENT NO.         : 11,030,588 B2
APPLICATION NO.    : 17/015200
DATED              : June 8, 2021
INVENTOR(S)        : Karim Michael Sanford et al.

Page 1 of 1

It is certified that error appears in the above-identified patent and that said Letters Patent is hereby corrected as shown below:

In the Claims

Claim 1, Column 21, Line 23, change "computer" to --computing--;
Claim 2, Column 21, Lines 42-43, change "combined amount first player" to --combined amount of first player--;
Claim 2, Column 21, Line 43, change "funds and amount" to --funds and the amount--;
Claim 7, Column 22, Line 3, change "funds in the contest until" to --funds until--;
Claim 8, Column 22, Line 47, change "first player computer device" to --first player computing device--;
Claim 9, Column 22, Line 63, change "amount first player" to --amount of first player--;
Claim 9, Column 22, Line 64, change "and amount" to --and the amount--; and
Claim 12, Column 24, Line 13, change "from first prepaid" to --from the first prepaid--.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*